(12) United States Patent
Cox

(10) Patent No.: US 11,650,570 B2
(45) Date of Patent: May 16, 2023

(54) CARD HAVING METALLIC CORE LAYER AND SYSTEMS AND METHODS FOR CARD MANUFACTURING

(71) Applicant: Idemia America Corp., Chantilly, VA (US)

(72) Inventor: Mark A. Cox, West Chester, PA (US)

(73) Assignee: Idemia America Corp., Chantilly, VA (US)

(*) Notice: Subject to any disclaimer, the term of this patent is extended or adjusted under 35 U.S.C. 154(b) by 678 days.

(21) Appl. No.: 16/248,256

(22) Filed: Jan. 15, 2019

(65) Prior Publication Data

US 2019/0204812 A1 Jul. 4, 2019

Related U.S. Application Data

(63) Continuation-in-part of application No. PCT/US2018/045600, filed on Aug. 7, 2018.
(Continued)

(51) Int. Cl.
*G05B 19/4155* (2006.01)
*B42D 25/475* (2014.01)
(Continued)

(52) U.S. Cl.
CPC ....... *G05B 19/4155* (2013.01); *B42D 25/305* (2014.10); *B42D 25/405* (2014.10);
(Continued)

(58) Field of Classification Search
CPC ...... G05B 19/4155; G05B 2219/49011; B42D 25/475; B42D 25/455; B42D 25/405;
(Continued)

(56) References Cited

U.S. PATENT DOCUMENTS

| 3,716,701 A | 2/1973 | Cohen |
| 6,191,382 B1 | 2/2001 | Damikolas |

(Continued)

FOREIGN PATENT DOCUMENTS

| CN | 102089772 A | 6/2011 |
| CN | 105190651 A | 12/2015 |

(Continued)

OTHER PUBLICATIONS

JP2004054483A Machine Translation of Description (EPO/Google) (Year: 2022).*

(Continued)

*Primary Examiner* — Cynthia L Schaller
(74) *Attorney, Agent, or Firm* — Duane Morris LLP

(57) ABSTRACT

A card manufacturing system includes a locating device and a separation device. A laminate sheet comprising a plurality of cards is received by the locating device and is imaged using first and second imaging modalities. The first imaging modality identifies a location of each of the plurality of information carrying cards within the laminate sheet and the second imaging modality images at least one graphic formed on a surface of the laminate sheet. A position of the at least one graphic with respect to at least one information carrying card is determined and the plurality of cards are removed from the laminate sheet using information corresponding to the location of each of the plurality of information carrying cards when the position of the at least one graphic with respect to the information carrying cards is within a predetermined range.

10 Claims, 21 Drawing Sheets

Related U.S. Application Data

(60) Provisional application No. 62/541,909, filed on Aug. 7, 2017, provisional application No. 62/568,517, filed on Oct. 5, 2017, provisional application No. 62/617,863, filed on Jan. 16, 2018.

(51) Int. Cl.

| | | |
|---|---|---|
| *B42D 25/485* | (2014.01) | |
| *B42D 25/46* | (2014.01) | |
| *B42D 25/305* | (2014.01) | |
| *B42D 25/455* | (2014.01) | |
| *B42D 25/405* | (2014.01) | |
| *G06K 19/077* | (2006.01) | |

(52) U.S. Cl.
CPC ......... *B42D 25/455* (2014.10); *B42D 25/46* (2014.10); *B42D 25/475* (2014.10); *B42D 25/485* (2014.10); *G06K 19/077* (2013.01); *G06K 19/07722* (2013.01); *G06K 19/07749* (2013.01); *G05B 2219/49011* (2013.01)

(58) Field of Classification Search
CPC .... B42D 25/485; B42D 25/46; B42D 25/305; G06K 19/07722; G06K 19/077; G06K 19/07749

See application file for complete search history.

(56) References Cited

U.S. PATENT DOCUMENTS

| | | | |
|---|---|---|---|
| 7,093,767 | B2 | 8/2006 | Faenza, Jr. et al. |
| 7,823,777 | B2 | 11/2010 | Varga et al. |
| 10,022,884 | B1 * | 7/2018 | Cloutier ................... B26D 7/27 |
| 10,583,683 | B1 * | 3/2020 | Ridenour ............. B42D 25/475 |
| 2004/0256469 | A1 | 12/2004 | Faenza, Jr. et al. |
| 2006/0260751 | A1 | 11/2006 | Lauder et al. |
| 2007/0272097 | A1 | 11/2007 | Priya et al. |
| 2008/0314995 | A1 | 12/2008 | Varga et al. |
| 2009/0020615 | A1 | 1/2009 | Patel |
| 2011/0036221 | A1 | 2/2011 | Saunders |
| 2013/0255078 | A1 * | 10/2013 | Cox .......................... B32B 3/08 29/830 |
| 2013/0258622 | A1 | 10/2013 | Cox |
| 2014/0292983 | A1 | 10/2014 | Nagahara |
| 2017/0262749 | A1 | 9/2017 | Cox |
| 2020/0238747 | A1 * | 7/2020 | Cox ................. G06K 19/07749 |

FOREIGN PATENT DOCUMENTS

| | | |
|---|---|---|
| JP | 2000158391 A | 6/2000 |
| JP | 2004054483 A | 2/2019 |
| KR | 20060029155 A | 4/2006 |
| KR | 20160066300 A | 6/2016 |
| WO | 2004063977 A2 | 7/2004 |

OTHER PUBLICATIONS

International Search Report and Written Opinion issued in connection with International Patent Application No. PCT/US2018/045600, dated Dec. 14, 2018, 17 pages.
State Intellectual Property Ofice of China, Office Action issued in corresponding Chinese Patent Application No. 201880065229.X dated Jul. 26, 2021.
European Patent Office, Extended European Search Report dated Mar. 16, 2021, for corresponding European Patent Appln. No. 18843493.0.
Canadian Intellectual Property Office, Office Action dated Dec. 3, 2021, for corresponding Canadian Patent Application No. 3,072,425.
Chinese Patent Office, Chinese Office Action issued for corresponding Chinese Patent Application No. 201880065229.X dated Jun. 6, 2022 (English translation of Search Report provided).
Guo et al., Optoelectronic Information Technology Experiment Teaching Course, 1st Edition, Mechatronics Computer Electronics, Chapters 6 and 7, Sep. 30, 2015, Xidian University Press, http://www.xduph.com.
Zhang et al., Autonomous Mobile Robot Manufacture, Xi'an Jiaotong University Press, May 31, 2008.

* cited by examiner

CARD HAVING METALLIC CORE LAYER AND SYSTEMS AND METHODS FOR CARD MANUFACTURING

CROSS-REFERENCE TO RELATED APPLICATIONS

This application is a continuation-in-part of International Patent Application PCT/US2018/045600, filed 7 Aug. 2018, entitled "CARD HAVING METALLIC CORE LAYER AND SYSTEMS AND METHODS FOR CARD MANUFACTURING," which claimed the benefit of U.S. Provisional Application Ser. No. 62/541,909, filed on Aug. 7, 2017, entitled "SYSTEMS AND METHODS FOR CARD MANUFACTURING," and U.S. Provisional Application Ser. No. 62/568,517, filed Oct. 5, 2017, entitled "SYSTEMS AND METHODS FOR CARD MANUFACTURING," and this application claims the benefit of U.S. Provisional Application Ser. No. 62/617,863, filed on Jan. 16, 2018, entitled "CARD HAVING METALLIC CORE LAYER AND SYSTEMS AND METHODS FOR CARD MANUFACTURING," each of which is incorporated herein in its respective entirety.

BACKGROUND

Information carrying cards provide identification, authentication, data storage and application processing. Such cards or parts include key cards, identification cards, telephone cards, credit cards, bankcards, tags, bar code strips, other smart cards and the like.

Current information carrying cards use plastic or other polymer material cores. Current materials fail to provide a desired tactile response and strength. For example, information carrying cards need to withstand flexing to protect identifying components from damage as well as offer good durability during use. In addition, information carrying cards should be appealing, in terms of appearance and feel, to the end user, in order to facilitate use and adoption of the information carrying card.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
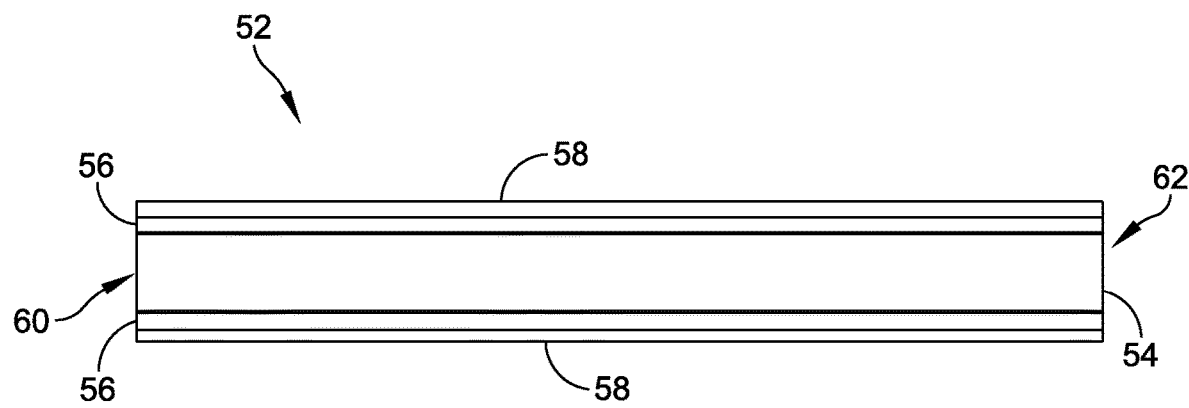
FIG. 1 illustrates a cross-sectional view of a layer structure of an information carrying card, in accordance with some embodiments.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise. The term "operatively coupled" is such an attachment, coupling, or connection that allows the pertinent structures to operate as intended by virtue of that relationship. Terms referring to electrical connections, such as "electrically connected," "electrically coupled," "in signal communication with," etc. refer to a relationship wherein an electrical signal may travel from one component to another component over any suitable wired or wireless channel or connection.

The following disclosure provides many different embodiments, or examples, for implementing different features of the subject matter. Specific examples of components and arrangements are described below to simplify the present disclosure. These are, of course, merely examples and are not intended to be limiting. For example, the present disclosure may repeat reference numerals and/or letters in the various examples. This repetition is for the purpose of simplicity and clarity and does not in itself dictate a relationship between the various embodiments and/or configurations discussed.

For brevity, unless expressly stated otherwise, references to "information carrying card" or "smart card" made throughout this description are intended to encompass at least key cards, identification cards, telephone cards, credit cards, bankcards, power cards, tags, bar code strips, any part comprising an integrated circuit (IC), and the like. "Information carrying card" or "smart card" also includes a wide variety of shapes, which include but are not limited to rectangular sheets, circular sheets, strips, rods and rings. "Information carrying card" or "smart card" also includes any information carrying parts of both "contact" and "contactless" modes. "Information carrying card" or "smart card" also encompasses any information carrying cards with or without an on-board power supply. An information carrying card comprising a power supply is also referred to as a "power card." The present disclosure generally relates to laminates for an information carrying card, resulting information carrying cards, and methods of making the same.

Information Carrying Card

FIG. 1 illustrates a cross-sectional view of an information carrying card, in accordance with some embodiments. In some embodiments, the information carrying card 52 includes a core layer 54, one or more printable films 56, and/or one or more transparent films 58. The printable films 56 and transparent films 58 can be, for example formed from a thermoplastic or any other appropriate material. In one embodiment, a printable film 56 and a transparent film 58 are disposed on either side of the core layer 54. In other embodiments, the information carrying card 52 includes a printable film 56 and a transparent film 58 on only one side of the core layer 54. In some embodiments, the information carrying card 52 includes one or more dimensions defined by one or more industry or commercial standards, such as an ISO/IEC 7810 standard. For example, an ID-1 type smart card, which is used for most banking and ID cards, has standardized dimensions of 85.6×53.98 mm, although it will be appreciated that the information carrying cards 52 discussed herein can have any suitable dimensions.

In some embodiments, the core layer 54 extends from a first edge 60 of the information carrying card 52 to an opposite, second edge 62 of the information carrying card 52. The core layer 54 can include one or more materials. For example, in some embodiments the core layer is constructed of a metallic material and/or a partially metallic material. The metallic material can be stainless steel—such as 305 stainless steel, tungsten, platinum, or any other appropriate material. As another example, in some embodiments, the core layer 54 includes a high density and/or a plastic material (such as a polyvinyl chloride (PVC) material and/or a polyethylene terephthalate (PET) material). The presence of a metallic, high density, and/or plastic core layer 54 increases the durability and longevity of the information carrying card 52. Additionally, the density or weight of an information carrying card 52 including a metallic and/or high density core layer 54 may be desirable to users. The edges of the information carrying card 52 can be finished with a variety of machining techniques to provide a desired surface finish, as discussed in greater detail below. By providing an aesthetically appealing edge 60, 62, the information carrying card 52 may be desirable for customers and potential customers of a bank or other financial institution. In addition, the finished edges 60, 62 prevent or limit damage to a user and/or the information carrying card 52 itself. To the extent embodiments are discussed herein including a first material in the core layer 54 (e.g., a metal material), it will be appreciated that such embodiments are generally applicable to other materials (such as high density and/or plastic materials) and are within the scope of this disclosure.

In some embodiments, an outer layer of an information carrying card 52 includes a transparent film 58. Examples of transparent film 58 include but are not limited to PVC (polyvinyl chloride) and PET (polyethylene terephthalate). Although specific embodiments of transparent films 58 are discussed herein, it will be appreciated that the transparent film 58 can include any suitable transparent material. In some embodiments, the transparent film 58 may be omitted and/or combined with one or more additional layers.

In some embodiments, the printable film 56 is an imaging receiving layer. Words, images, and/or other elements can be printed onto the printable film 56 before or during a process of making an information carrying card 52. In some embodiments, the printable film 56 is not transparent, and contains some pigments such as white pigments, color pigments, etc. Although specific embodiments of printable films 56 are discussed herein, it will be appreciated that any suitable printable film or graphic layer can be positioned between the core layer 54 and a transparent film 58. In some embodiments, the printable film 56 may be omitted and/or combined with one or more additional layers.

Figure 2:
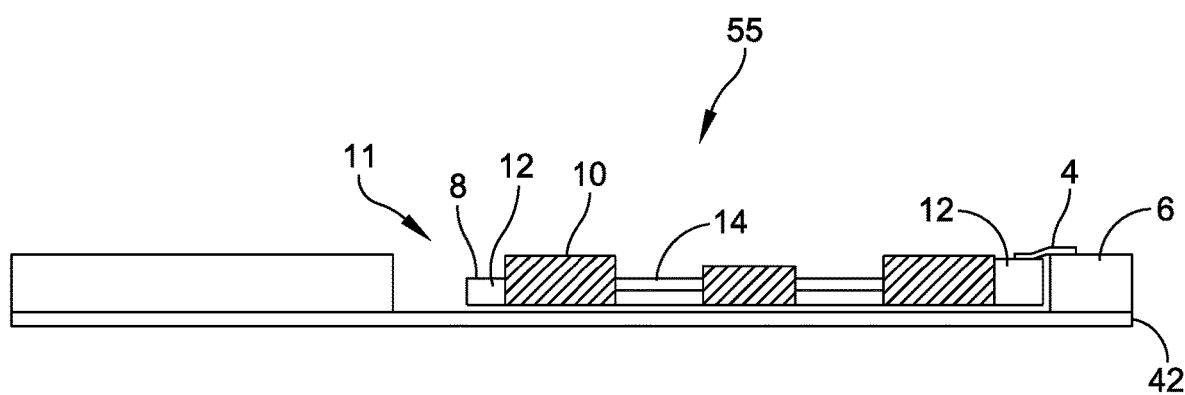
FIG. 2 illustrates a cross-sectional view of an electronics layer of an information carrying card, in accordance with some embodiments.

Additionally, as seen in FIG. 2, in some embodiments, the information carrying card 52 can include an electronic layer 55 comprising electronic components 10, such as a printed circuit board (PCB) 11, supporting film 12 and interconnects 14. The electronic components 10 are connected by the interconnects 14. The electronic components 10 are embedded or surface-mounted on the supporting film 12. In some embodiments, the electronic components 10 are disposed on an inlay layer 8. The inlay layer 8 can be disposed within a housing layer 6. The housing layer 6 can be constructed of a thermoplastic material. A polymer composition (not shown) can fill voids and remaining spaces between the inlay layer 8 and the housing layer 6. In some embodiments, the polymer composition 16 is a cross-linked polymer composition. The polymer composition 16 can directly contact the outer surface of the electronic components 10. The electronic layer 55 can be configured and manufactured as described in U.S. Pat. No. 9,275,321, which is incorporated herein in its entirety.

Figure 3:
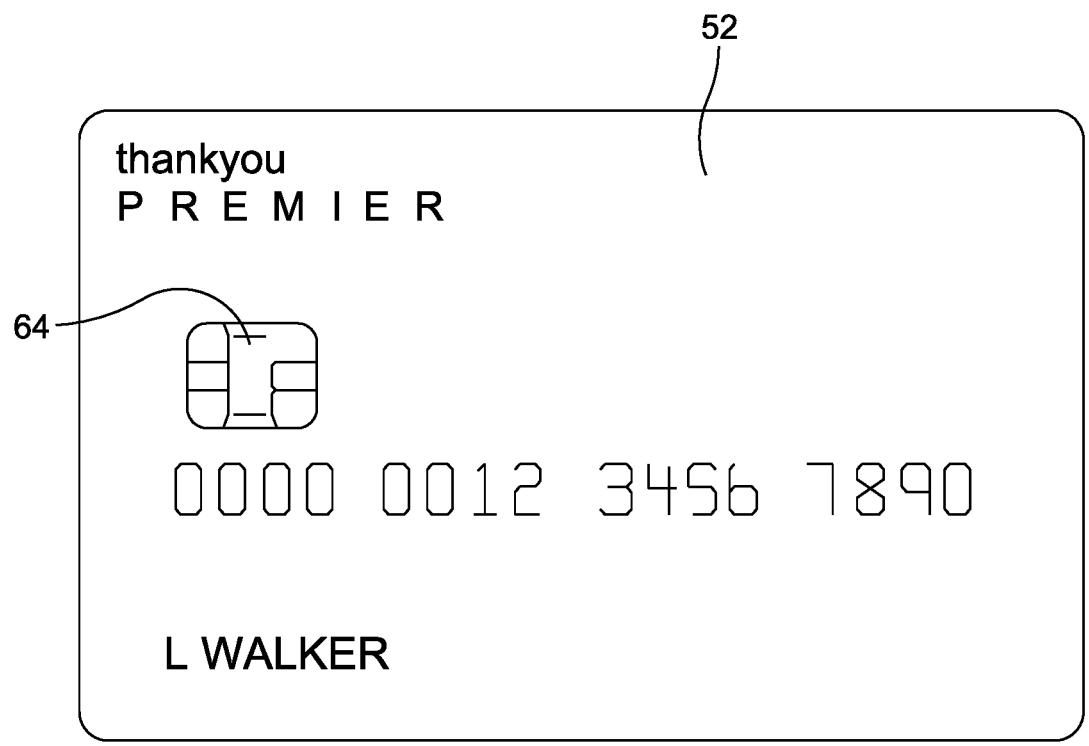
FIG. 3 illustrates an information carrying card having an EMV (Europay MasterCard Visa) chip embedded therein, in accordance with some embodiments.

In some embodiments, the electronic layer 55 is disposed between the core layer 54 and one of the printable films 56. The electronic layer 55 can enable the card 52 to include advanced security features, such as one-time passwords. For example, the smart card can include the security features described in U.S. Pat. No. 9,004,365, which is incorporated herein in its entirety. As shown in FIG. 3, in some embodiments, the information carrying card 52 includes an EMV chip 64 and/or other embedded objects including three-dimensional objects. Such features allow the information carrying cards 52 to include traditional magnetic strips, EMV chips 64 as well as contactless payment technologies. The information carrying card 52 can also include advanced security features such as on-demand CVV generation.

Prelam Formation

Figure 4A:
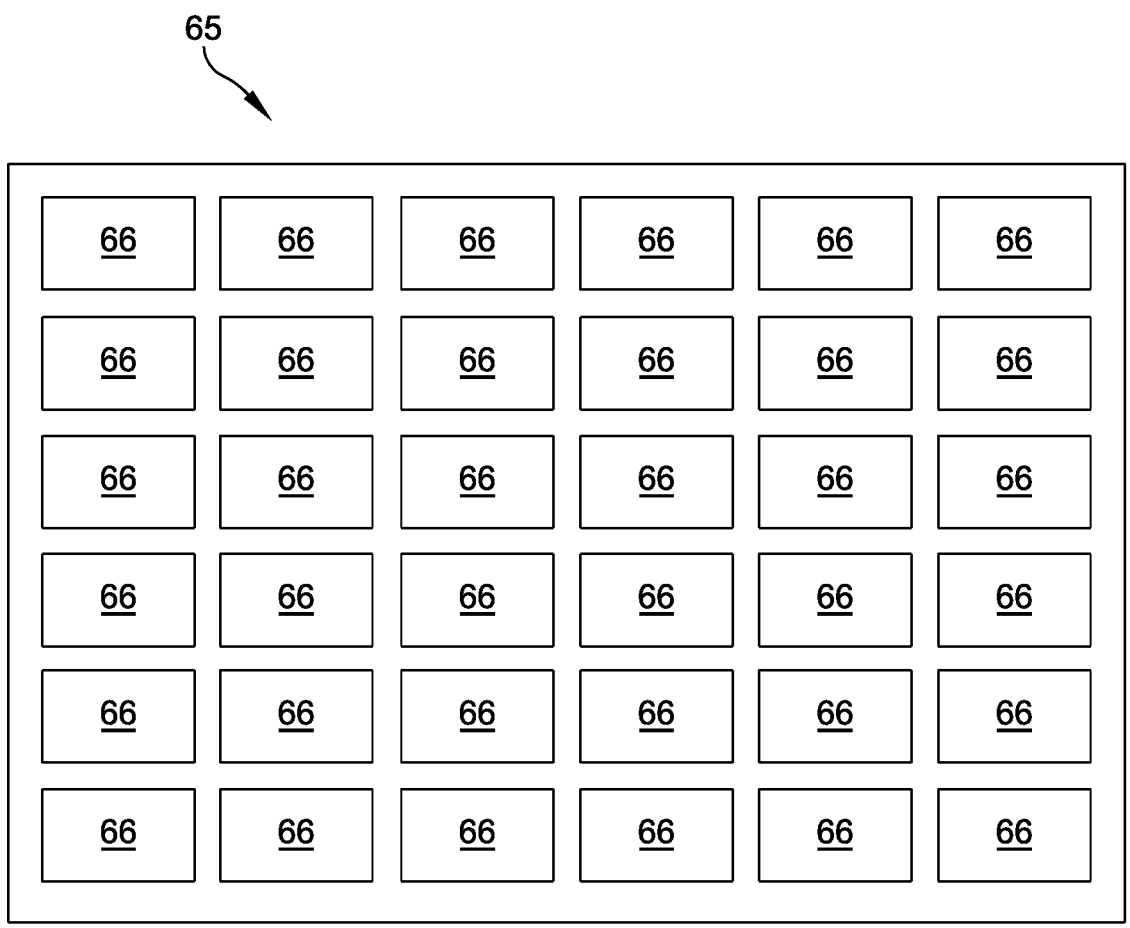
FIG. 4A illustrates a plan view of a frame having a plurality of cavities, in accordance with some embodiments.

FIG. 4A illustrates a frame 65, in accordance with at least one embodiment. The frame 65 can be constructed of PVC and/or other appropriate material and defines a plurality of cavities 66. Each of the plurality of cavities 66 is sized and configured to accept a core layer 54.

Figure 4B:
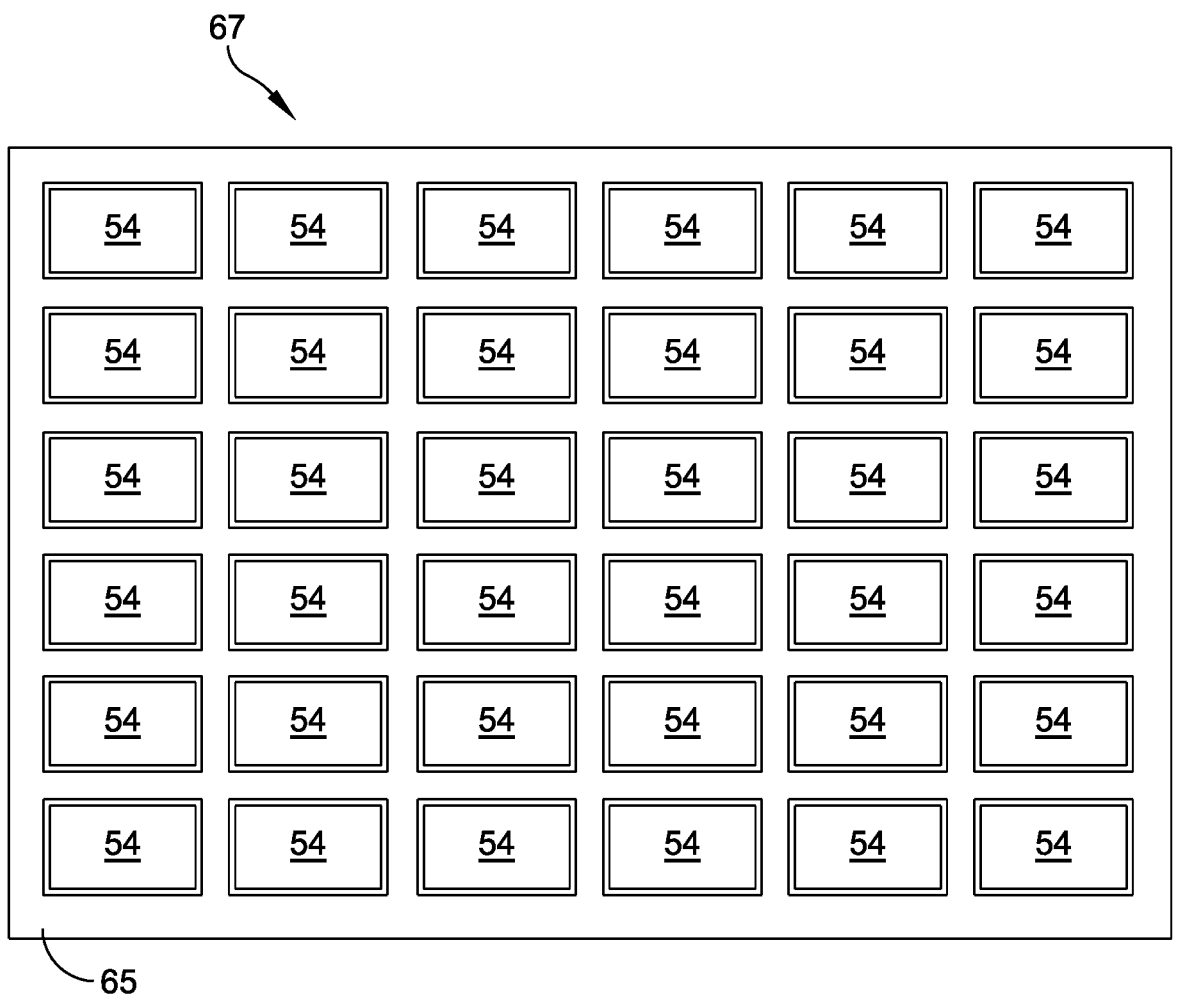
FIG. 4B illustrates a plan view of a frame of the sheet of FIG. 4A with a plurality of core layers disposed in the cavities, in accordance with some embodiments.

As shown in FIG. 4B, a prelam 67 can be formed by positioning a core layer 54 in each of the cavities 66 of the frame 65. The core layers 54 can be positioned in the cavities 66 manually or, for example, by an automated pick and place system. The core layers 54 can be secured in place within the cavities 66 by any appropriate means. For example, the core layers 54 can be held in place by adhesives, tape, and/or other means. In one embodiment, the frame 65 and core layers 54 are maintained in relative position by one or more carrier sheets adhered to the frame 65 and core layers 54. The prelam 67 shown in FIG. 4B is a "36-up" sheet, i.e., consisting of six rows of six core layers. This arrangement provides for a high throughput while minimizing the amount of material that is removed during a singulation process (discussed in greater detail below). It should be understood that other arrangements of core layers 54 are contemplated and are within the scope of this disclosure. Advantageously, the singulation process described in further detail herein allows for flexibility in shape, orientation, and quantity of core layers 54.

Figure 5:
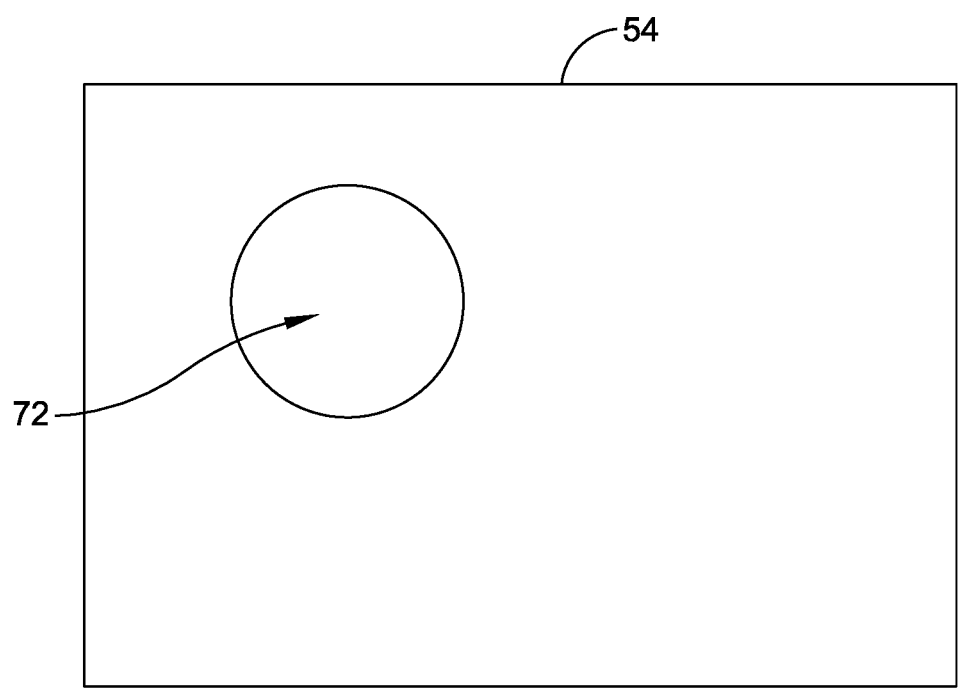
FIG. 5 illustrates a core layer having a discontinuity extending from a first edge of the core layer, in accordance with some embodiments.

As shown in FIG. 5, in some embodiments, the core layer 54 can include internal features which allow the placement of security and/or decorative features in an information carrying card 52. For example, the core layer 54 includes an internal cavity 72 for placement of an EMV chip, a decorative element such as an inlay, and/or any other suitable element.

In some embodiments, one or more printed circuit elements can be disposed within each of the internal cavities 72 formed in the core layer 54. For example, in the various embodiments, an antenna including one or more circular coils can be disposed within the internal cavity 72, although it will be appreciated that the antenna can have any suitable shape and/or any suitable number of windings (or coils). A plurality of contact points may be configured to electrically couple an active circuit element, such as an integrated circuit, processor, or other system-on-chip (SoC) element to the printed circuit elements formed within the internal cavity 72.

In some embodiments, the one or more printed circuit elements can include a second antenna (not shown). The second antenna can be positioned within the cavity 72 and/or can be positioned in one or more additional cavities (not shown) defined in the core layer 54a. The second antenna can have a greater and/or lesser antenna area than the first antenna such that the first and second antennas produce different voltages when exposed to the same signal. In some embodiments, the first antenna can control operation of the active circuit element and the second antenna can control operation of additional circuit elements (not shown).

In some embodiments, the one or more printed circuit elements are configured to be self-leveling during a credential card formation process. The printed circuit elements are formed within the metal core layer 54 and can be raised and/or lowered during formation of a laminate sheet 50. For example, in some embodiments, the printed circuit elements can flex out of plane with the respect to the core layer 54 when a filler material is provided within the internal cavity 72. During some laminate formation processes, the core layer 54 is exposed to and/or immersed in a liquid filler material, and the printed circuit elements are self-leveled (i.e., centered) with respect to the core layer 54.

In some embodiments, the filler material can include any suitable material, such as a moly-based material (e.g., molybendum), a PVC material, a PET material, and/or any other suitable material. The filler material can be selected to have a similar feel/weight as compared to the core layer 54 to maintain a uniform feel to the card 52.

Surface preparation techniques can be used to improve the adhesion of the printable film 56 and/or transparent film 58 to the core layers 54. Such preparation can include coating of the core layers 54 with EVA (ethylene-vinyl acetate) or EAA (ethylene acrylic acid). In embodiments in which the core layers 54 are attached to a frame 65 of a different material, the surface preparation of the core layers 54 can be performed before and/or after connection of the core layers 54 to the frame 65.

In at least some embodiments, the core layers 54 are larger in size than the desired information carrying card 52. The excess material of the core layer 54 allows the information carrying cards 52 to be cut or singulated to a final size after the lamination process, as described further herein.

In some embodiments, multiple core layers 54 are connected prior to placement within the frame 65. The multiple core layers 54 can be etched from a single metal sheet, with the multiple core layers 54 connected by runners. The etched sheet is placed within a frame 65 that includes cavities 66 for the multiple core layers 54 and voids for the connecting runners. In this way, processing and handling of the core layers 54 is simplified. Instead of handling each core layer 54 individually, a single sheet is placed within the frame 65. The single sheet simplifies handling as well as eases inventory management of the core layers 54.

Figure 6:
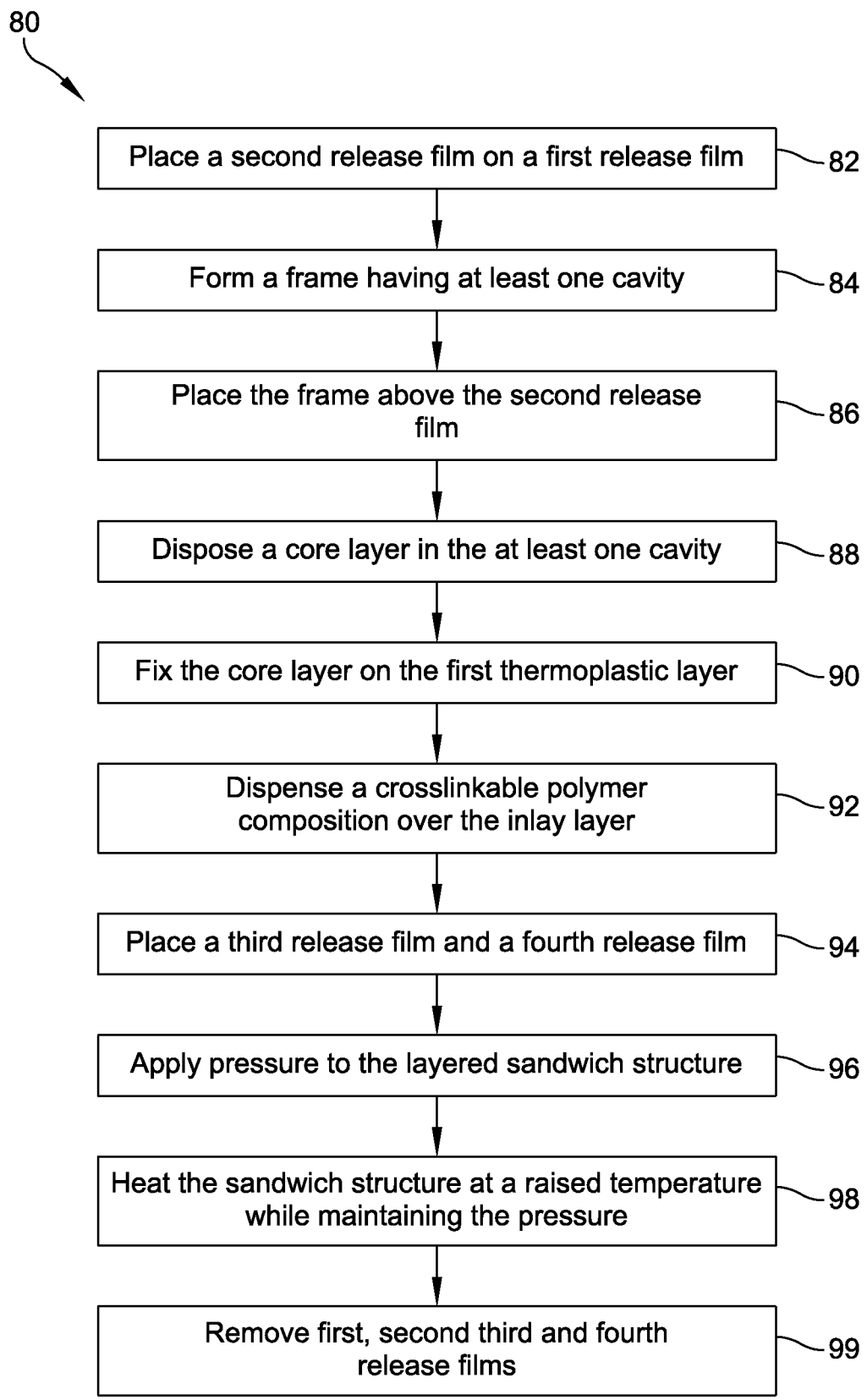
FIG. 6 illustrates a flow diagram of a method of forming a prelaminate, in accordance with some embodiments.

Referring to FIG. 6, a process 80 for forming a prelaminate, in accordance with some embodiments is discussed. At step 82, a second release film is placed above a first release film. At step 84, a frame 65 having at least one cavity 66 is obtained. For example, the frame 65 may be formed in conjunction with the process 80 for forming a prelaminate. Alternatively, the frame 65 may be formed prior to executing the process 80 and may be obtained from an inventory store of preformed frames. At step 86, the frame 65, having at least one cavity, is placed above the first and second release films. At step 88, a core layer 54 is placed at least partially into a cavity 66 of the frame 65.

Following step 88, the process optionally comprises step 90 of "fixing" the core layer 54 on frame 65 using an instant adhesive. For example, in some embodiments, the instant adhesive includes cyanoacrylate, although it will be appreciated that any suitable adhesive can be used. In some embodiments, the core layer 54 is fixed to the frame 65 in a period as short as a few seconds, although it will be appreciated that each adhesive will require a greater and/or lesser adhesion time, depending on one or more environmental, chemical, and/or other factors.

At step 92, a cross-linkable polymer composition is dispensed over the core layer 54 and inside the cavity 66. In embodiments with an electronic layer 55, the cross-linkable polymer composition may directly contact the electronic components 10 including active or passive electronic components, e.g., an integrated circuit (IC). In some embodiments, the amount of cross-linkable polymer composition is predetermined and controlled. Any extra material exceeding the top surface of the frame 65 may be removed. In some embodiments, the curable base polymer resin in the cross-linkable polymer composition is urethane acrylate, and the particulate thermoplastic filler in the cross-linkable polymer composition is PVC, a compound or a blend comprising PVC or a vinyl chloride copolymer, or a copolymer of vinyl chloride and at least another monomer such as vinyl ester or vinyl ether, although it will be appreciated that other suitable chemical compositions can be used.

In some embodiments, the cross-linkable polymer is configured to fill one or more cavities 72 formed in the core layer 54 and/or the electronics layer 55. The cross-linkable polymer may fully and/or partially fill each cavity 72. In some embodiments, one or more elements of the electronic layer 55 are self-leveling such that the one or more elements are positioned at a predetermined midpoint (or other selected point) within the volume of cross-linkable polymer within the cavity 72.

At step 94, a third release film and a fourth release film are placed on the layered structure to form a sandwich structure. The third release film is placed first followed by the fourth release film. In some embodiments, the third release film is formed from the same material as the second release film, such as a breathable release film. The fourth release film may be formed from the same material as the first release film. In some embodiments, the first and fourth release films are a polytetrafluoroethylene (under the trade name Teflon®) sheet, although it will be appreciated that other films may be used. At step 96, the layered structure is placed under pressure, e.g., a pressure of less than about 2 MPa.

At step 98, the layered structure is heated under pressure. A suitable temperature would be one that is sufficiently high to partially or fully cure the cross-linkable polymer composition, hot laminating first thermoplastic film, or both. After the heat treatment, the cross-linkable polymer composition forms a solid. Such a cross-linked polymer composition has good adhesion with the frame 65 and the core layer 54 including, optionally, electronic component 10 and supporting film 12. In some embodiments, the temperature is in the range of 65-232° C. In some embodiments, the temperature is less than 150° C. It will be appreciated that any suitable temperature or temperature range can be used based on the properties of the cross-linked polymer and/or the heat tolerance of one or more components in the layered structure (such as one or more elements in the electronics layer 55).

In some embodiments, step 98 may be replaced and/or augmented by a step of curing the cross-linkable polymer composition using visible light, UV or other radiation curing. It may also comprise a step of curing via the introduction of moisture or the promotion of other chemical reactions. At optional step 99, the layered structure is cooled and the first, second, third and fourth release films are removed. After process 80, the cross-linkable polymer composition is cured so as to yield a solid. After the release films are peeled away, a prelaminate for an information carrying card is formed. The prelaminate comprises a frame 65, a plurality of core layers 54 and a cured cross-linked polymer composition. The prelaminate may be stored and/or immediately transferred to a card manufacturing system, such as card manufacturing system 2 described in greater detail below.

In some embodiments, a frame 65 without cavities 66 is used. In such an embodiment, core layers 54 are positioned on a top surface of the frame 65. The core layers 54 may be secured to the top surface of the frame 65 by adhesive or other means. Prior to placement, the core layers 54 may be treated, on one or both faces, with EVA or EAA to improve the adhesion of the core layers 54 to the frame 65. The core layers 54 may be placed manually and visual alignment guides (not shown) may be provided on the frame 65 to ensure that the core layers 54 are placed in the correct location. Alternatively, the core layers 54 can be placed using an automated pick and place system which allows for the accurate placement of the core layers 54. After placement of the core layers 54 on the frame 65, an additional layer of EVA or EAA may be placed on the top of the core layers 54. The bottom layer, core layers 54, and top layer can then be laminated together to form a subassembly which can be further processed as described herein.

Figure 7:
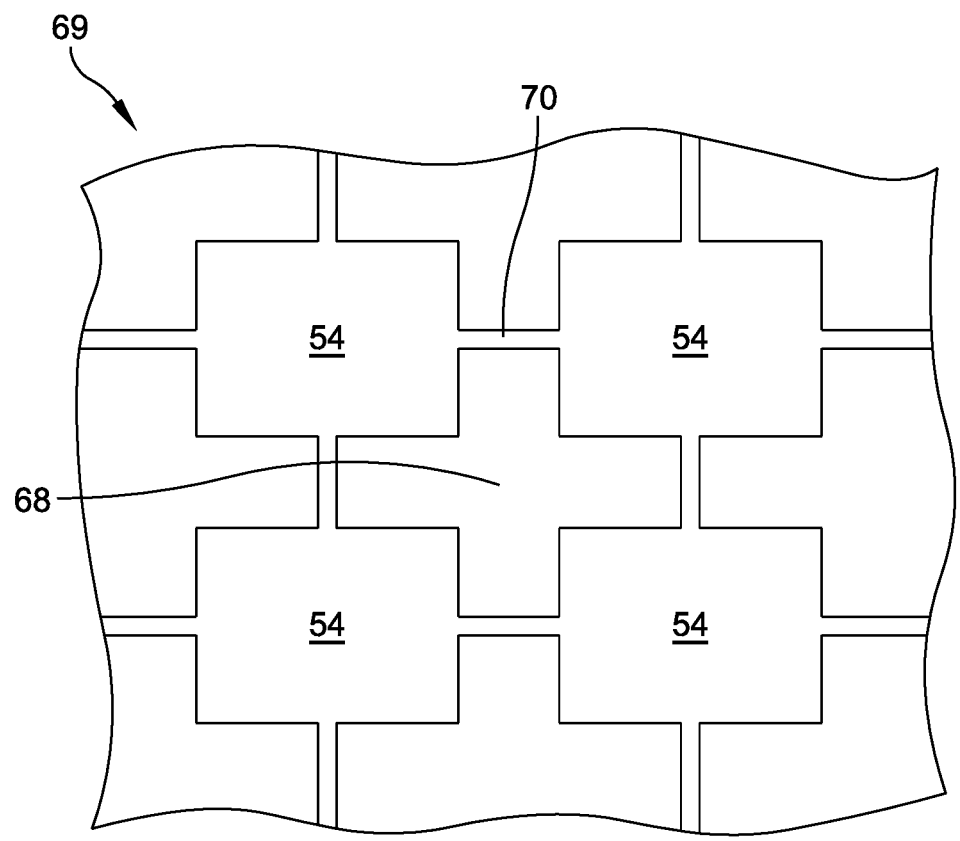
FIG. 7 illustrates a detail view of a plurality of core layers, in accordance with some embodiments.

In some embodiments, each of the core layers 54 may be individually placed and/or two or more of the plurality of core layers 54 may be connected to adjacent core layers 54 by runners 70 to form a sheet 69 (as shown in FIG. 7). Voids 68 may be present between adjacent core layers 54. The presence of the voids 68 may allow for flexing or movement of the individual core layers 54 during the manufacturing process without affecting adjacent core layers 54. This can improve the finish of the information carrying cards 52 produced from such core layers 54. For example, the ability of the core layers 54 to move and/or flex with respect to one another may prevent warping of the core layers 54, leading to a finished information carrying card 52 with improved flatness. In addition, because adjacent core layers 54 are only connected by relatively thin runners 70, singulation of the core layers 54 does not lead to unacceptable heat generation or excessive wearing of machine bits. A plurality of sets of core layers 54 can be placed on the bottom layer, as described above. By providing sets of connected core layers 54, the processing time and burden is reduced, leading to increased throughput.

The sets of core layers 54 can be arranged in any arrangement. For example, the sets may include six core layers 54 connected linearly. Alternatively, the sets can include four or more core layers 54 arranged in a square or rectangular arrangement, as shown in FIG. 7. In some embodiments, the runners 70 connect neighboring core layers 54 to maintain the integrity of the sheet 69. The runners 70 may be positioned at any point along the core layers 54. For example, as shown in FIG. 7, the runners 70 can be approximately centrally located with respect to the core layers 54. In other embodiments, the runners 70 are offset from the center of the core layers 54. The runners 70 may have a constant width and/or a variable width along the length of the runners. Each runner 70 in the sheet 69 can have the same width or, alternatively, the runners 70 may be of different widths throughout the sheet 69. The plurality of core layers 54 can be defined in any suitable manner, such as, for example, etching, machining, and/or other appropriate processes. The core layers 54 and sheet 69 can be constructed from stainless steel, tungsten, gold, platinum, or any other appropriate material. In some embodiments, the metallic sheet 69 can include different alloys or metals formed integrally together, with a first metal defining one or more of the plurality of core layers 54 and a second metal defining the runners 70 and perimeter of the sheet 69. Although specific embodiments are discussed herein, it will be appreciated that the core layers 54 can include any suitable material and/or combination of materials.

Lamination

Figure 8:
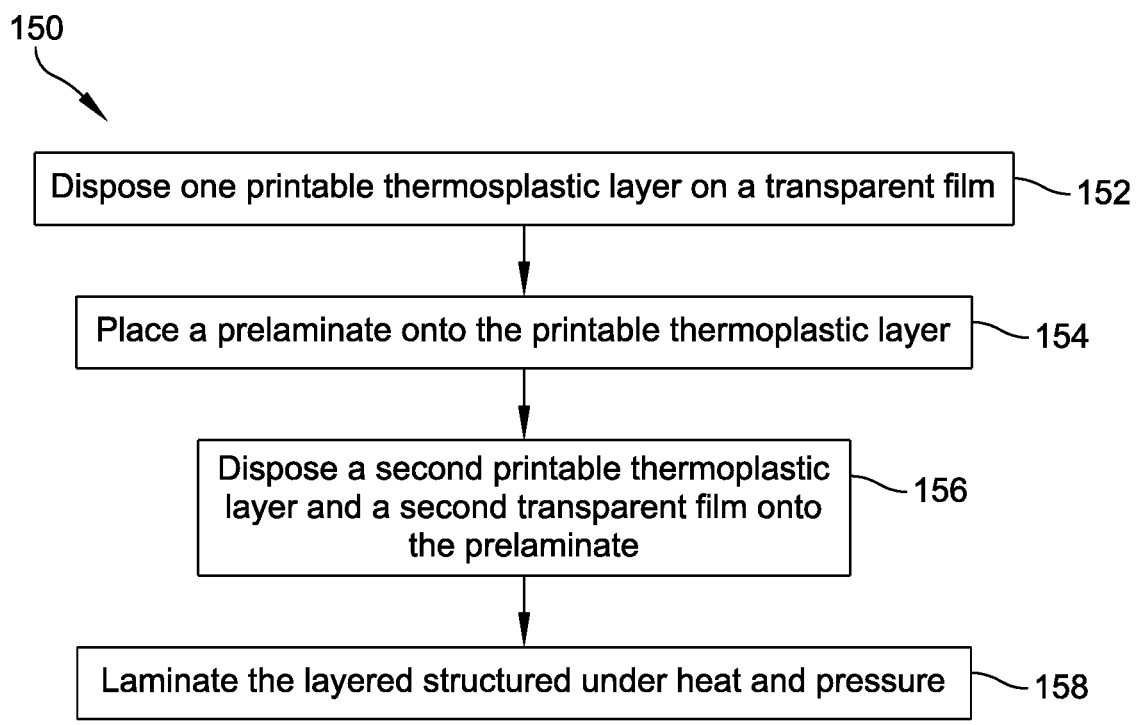
FIG. 8 illustrates a flow diagram of a method of forming a laminate, in accordance with some embodiments.

FIG. 8 illustrates an exemplary process 150 of making a laminate 5, in accordance with some embodiments. In some embodiments, the outer layer of an information carrying card 52 includes a transparent film 58. Examples of transparent film 58 include but are not limited to PVC, modified PVC, and PET. At step 152, and with reference to the structure shown in FIG. 1, a printable film layer 56 is disposed onto the transparent film 58. In some embodiments, the printable film 56 is an image receiving layer. Words, images, and/or other graphical elements are printed onto the printable film 56 before or during a process of making a laminate. In some embodiments, the printable film 56 is not transparent, and contains some pigments such as white pigments.

In step 154, a prelaminate 67 is disposed onto the printable thermoplastic layer 56 and the transparent film 58. In step 156, a second printable thermoplastic layer 56 is disposed onto the layered structure, followed by a second transparent film 58. In some embodiments, at least one release film is used on each side of the layered structure. Examples of the release film include a sheet of polytetrafluoroethylene, any other fluoropolymer, silicone, a fluoropolymer or silicone coated film, and/or any other suitable release film. In some embodiments, a breathable release film is used.

In step 158, the layered structure is laminated at a predetermined pressure and a predetermined temperature. In some embodiments, the pressure is less than 2 MPa. The predetermined temperature is selected such that all the films in the layered structure are laminated with good adhesion. In some embodiments, the predetermined temperature is in the range of 65-232° C. In some embodiments, the predetermined temperature is less than 150° C. Although embodiments are discussed herein having specific temperatures or temperature ranges, it will be appreciated that the predetermined temperature can be any temperature configured to laminate the layered structure with good adhesion at the selected pressure. In some embodiments, additional and/or alternative laminating/curing methods can be applied, for example, ultraviolet (UV) curing, etc.

In some embodiments, at optional step 160, a surface treatment method is performed to improve adhesion between two or more layers. Examples of surface treatment methods include but are not limited to plasma treatment and/or corona treatment before hot lamination at step 158.

Singulation Process

Figure 9:
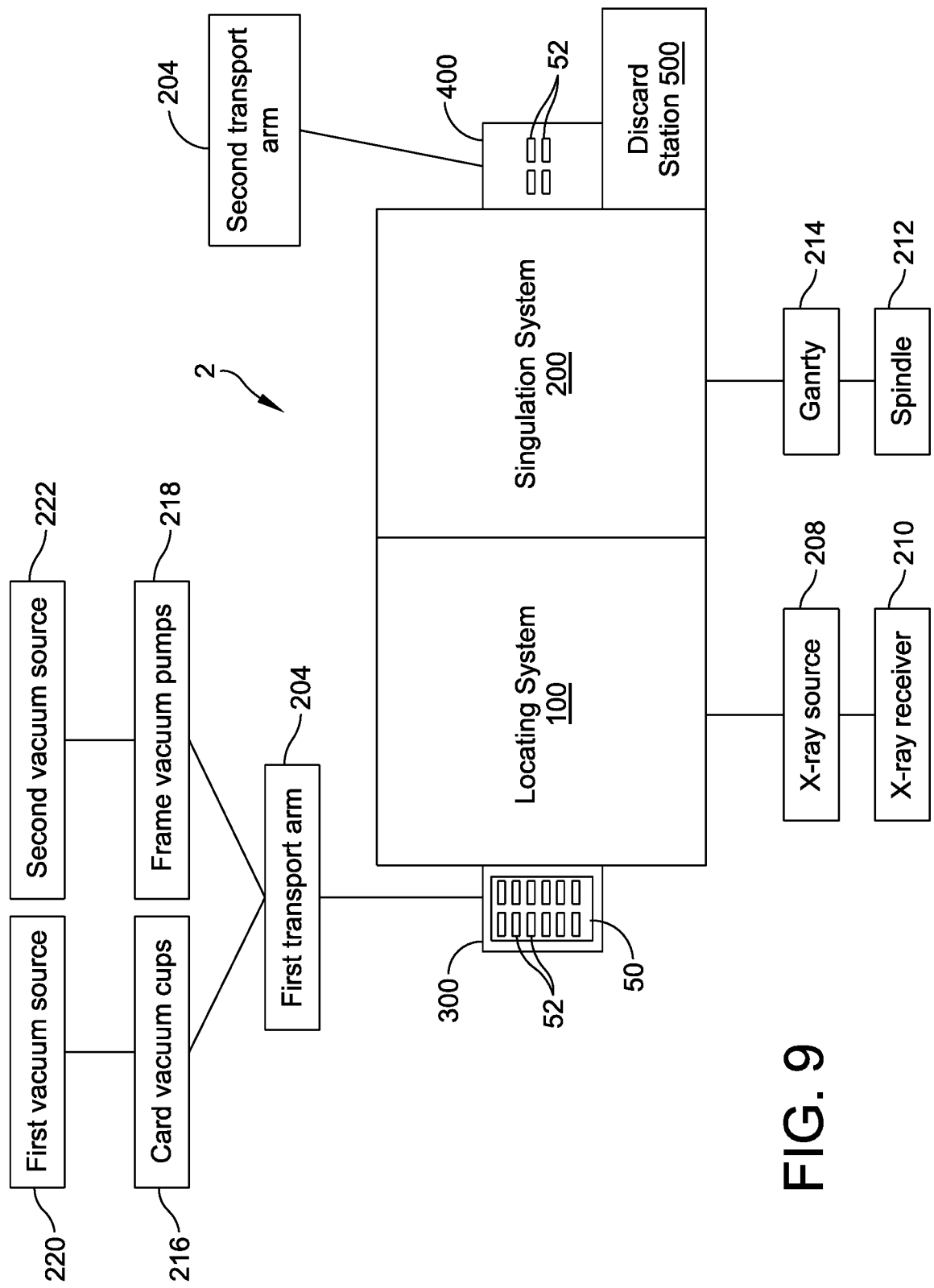
FIG. 9 illustrates a card manufacturing system including a locating system and a singulation system, in accordance with some embodiments.

FIG. 9 illustrates a card manufacturing system 2 including a locating device 100 and a separation device 200, in accordance with some embodiments. The card manufacturing system 2 is configured to receive one or more laminate sheets 50 (e.g., one or more laminated sheets 50 of information carrying cards 52 manufactured substantially as discussed above) and generate a plurality of physical information carrying cards 52, such as, for example, credit cards, credential cards, etc. After forming a laminate sheet 50, the position of the core layers 54 within the laminate may vary. For example, variation in the alignment of the layers during the lamination process can result in one or more core layers 54 having offset or unknown positions. In addition, there may be variations in the placement of the core layers 54 within the frame 65. As a result, it is necessary to accurately determine the location of the core layers 54 prior to singulating the individual cards. By so doing, the individual cards can be separated such that the edges of the card show an exposed metal edge while at the same time requiring only a small amount of material to be removed from the metal core layers, advantageously minimizing the heat buildup during singulation and minimizing the wear on singulation tools.

In some embodiments, the card manufacturing system 2 includes a locating device 100 configured to locate one or more elements within the laminate sheet 50, for example, the position of each core layer 54 within the laminate sheet 50. Each of the laminate sheets 50 has a known outer perimeter (e.g., known height and length) and includes a plurality of cards 52 formed integrally therein, for example, according to the formation and lamination process discussed above. Each laminate sheet 50 can have a variable number of cards 52 formed therein and/or each of the cards 52 can have variable dimensions from one or more other cards formed on an individual laminate sheet 50. In some embodiments, the laminate sheet 50 is a multi-layer laminate including one or more metal, plastic, electronic, image, and/or additional or alternative layers, as described above. In addition, U.S. Pat. No. 9,122,968, issued on Sep. 1, 2015, entitled "Information Carrying Card Comprising a Cross-Linked Polymer Composition, and Method of Making the Same" describes various other embodiments of prelaminate and laminate manufacturing, and is incorporated by reference herein in its entirety.

With reference back to FIG. 9, the locating device 100 is configured to receive each of the laminate sheets 50 individually and identify the position of each card 52 within the laminate sheet 50 (i.e., inspect the laminate sheet 50). The locating device 100 includes a locating modality configured to locate one or more features of each of the cards 52 to identify the position of each card 52 within the laminate sheet 50. In some embodiments, the locating modality includes an imaging modality configured to image the laminate sheets 50 in a non-visible and/or visible spectrum. For example, in various embodiments, the locating device 100 includes one or more of an x-ray imager, an ultrasonic imager, a nuclear imager, an ultraviolet imager, sonogram (magnetic resonance) and/or any other suitable imager operating outside of the visible spectrum. The locating device 100 may also include a visible spectrum imager, such as a charge-coupled device (CCD), complementary metal-oxide-semiconductor (CMOS), and/or any other suitable digital sensor.

In some embodiments, the locating device 100 includes a locating modality configured to identify one or more materials present in each of the plurality of cards 52 but not present in the surrounding material of the laminate sheet 50. For example, in some embodiments, each of the plurality of cards 52 includes at least one core layer 54 having a first material that is absent from the surrounding material, such as, for example, a metal material, a high-density material, etc. The locating modality is configured to identify the position of the at least one core layer 54 within each of the plurality of cards 52, for example, using an imaging modality (as discussed above) and/or a non-imaging modality. In some embodiments, the locating modality of the locating device 100 includes a non-imaging detection unit configured to locate the core layers 54 of the laminate sheet 50. For example, in embodiments including a metal core layer 54, the non-imaging detection unit can include a metal detector. The non-imaging detection unit can include any unit configured to detect the first material of the core layer 54. Although embodiments are discussed herein including at least one metallic core layer 54 and non-metal filler material, it will be appreciated that the locating device 100 can be used to identify the locations of core layers constructed of a variety of materials.

The locating device 100 is configured to locate each card 52 within the laminated sheet 50 and provide positional guidance to the separation device 200. The positional guidance can include, but is not limited to, visual spectrum markings at predetermined positions corresponding to each of the plurality of cards in the laminate sheet 50, one or more markings corresponding to one or more reference locations on the laminate sheet 50 and information for calculating card positions from the reference location, as a mapping (or other digital) file including information regarding positions of each card 52 within the laminate sheet 50 based on markings and/or edge information of the laminate sheet 50, and/or any other suitable positional guidance. The mapping and/or information files can be stored in tangible, non-transitory memory that can be accessed by the separation device 200 to guide singulation of the individual cards 52, as discussed in greater detail below. It will be appreciated that the locating device 100 can implement additional, alternative, and/or combinations of marking systems as discussed herein.

Figure 10A:
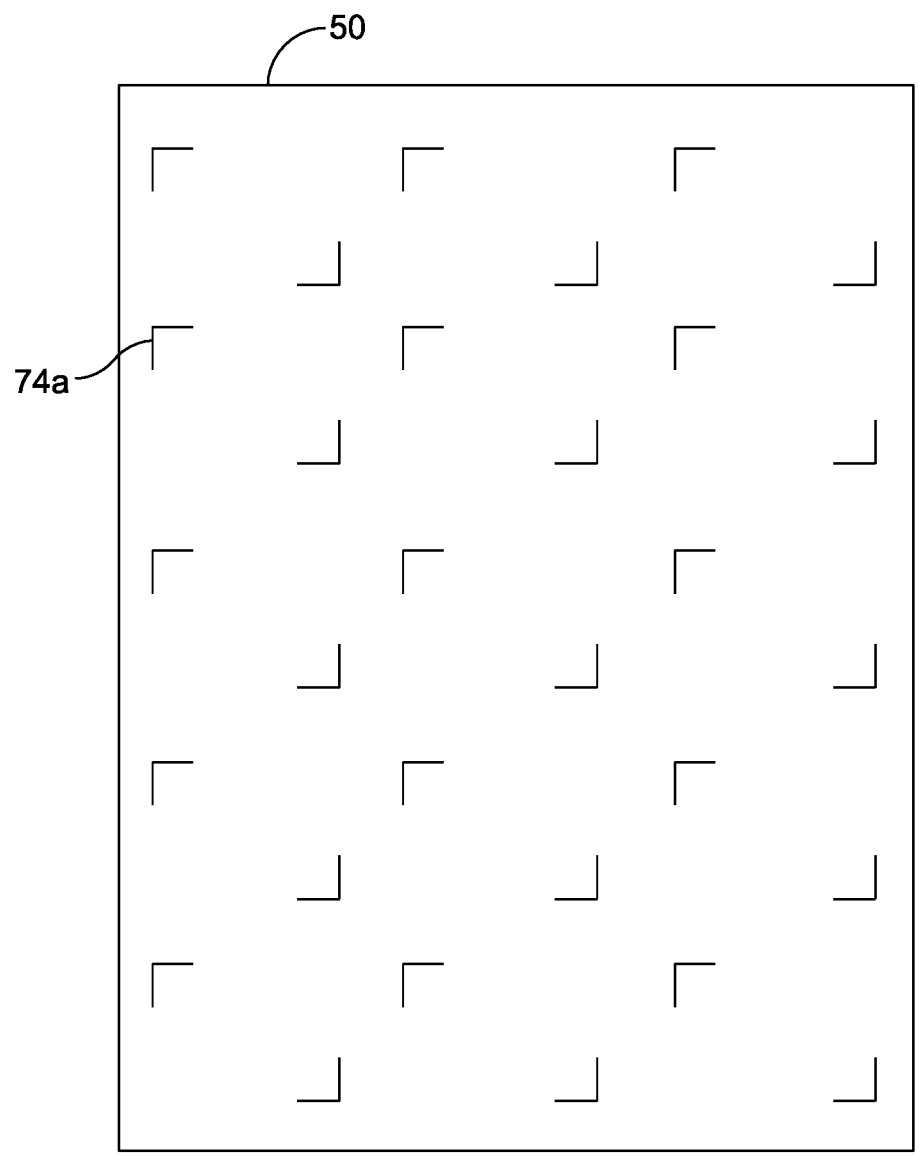
FIG. 10A illustrates a plan view of a laminate sheet having registration markings corresponding to a position of each card in the laminate sheet, in accordance with some embodiments.
Figure 10B:
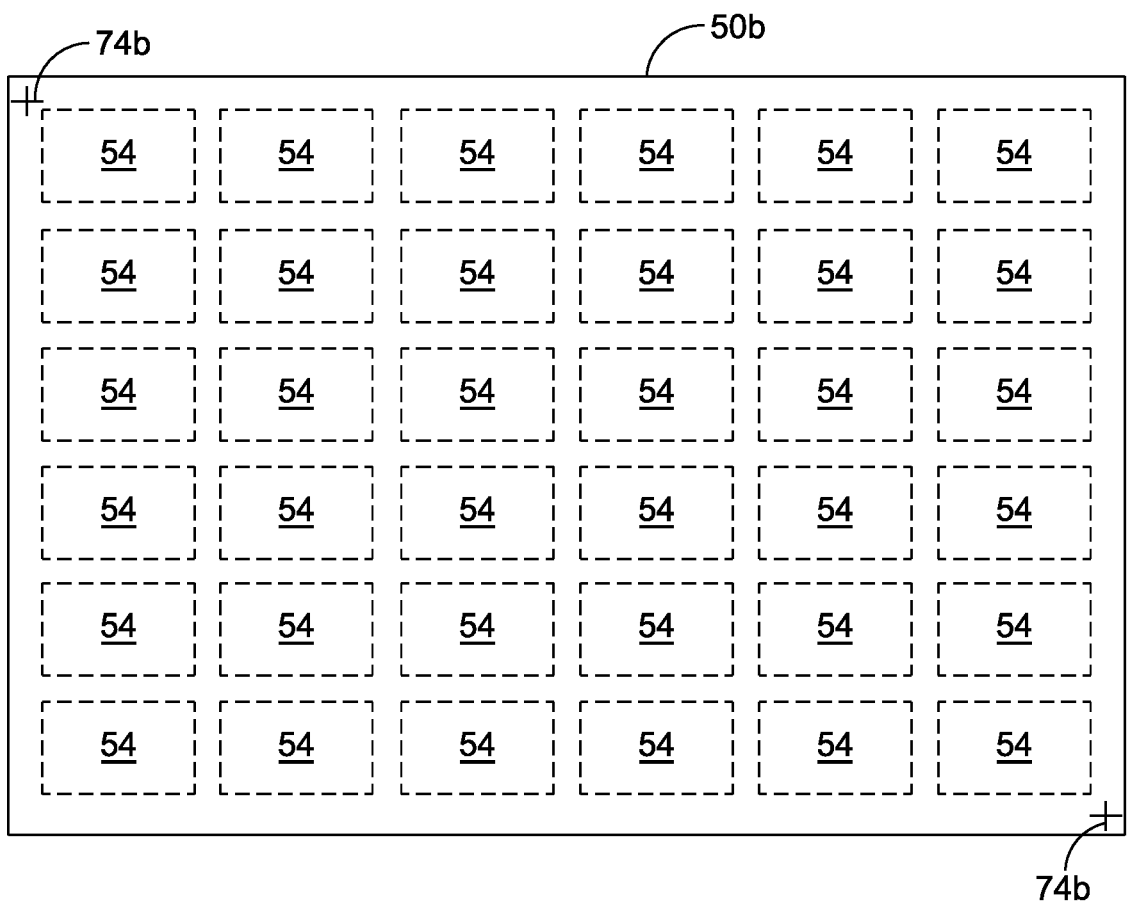
FIG. 10B illustrates a plan view of a laminate sheet having reference registration markings formed thereon, in accordance with some embodiments.
Figure 11:
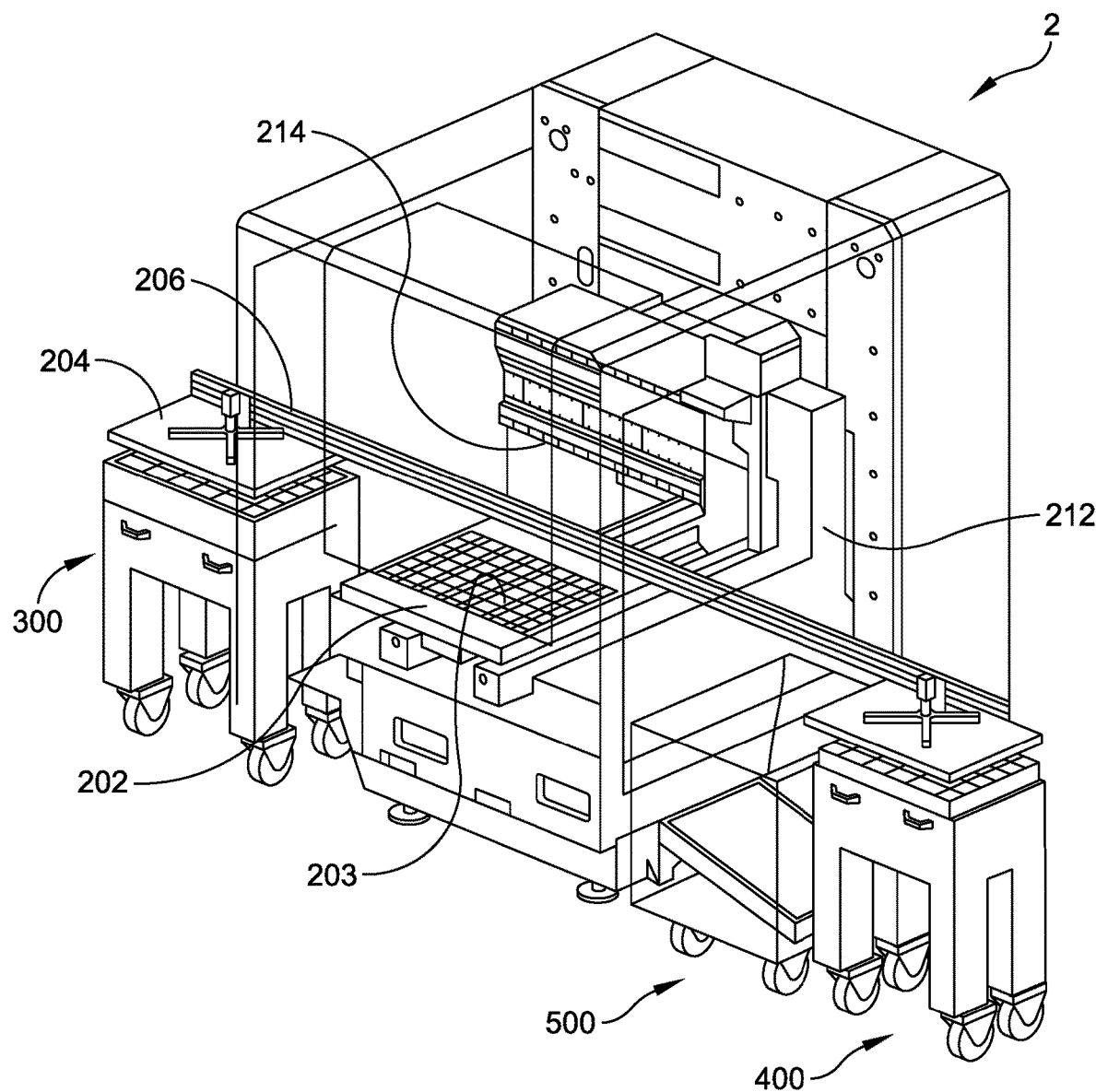
FIG. 11 illustrates an isometric view of a card manufacturing system, in accordance with some embodiments.

In some embodiments, the locating device 100 is configured to generate markings 74 and/or other indicators on the laminate sheet 50. For example, in some embodiments, markings 74a correspond to edge positions of each of the plurality of cards 582 within the laminate sheet 50, as shown in FIG. 10A. In the illustrated embodiment, the markings 74a include markings corresponding to a first corner and a second corner of each of the cards 52, although it will be appreciated that the markings 74a can correspond to any portion of a card 52, such as, a partial and/or full perimeter of the card 52, one or more edges of the card 52, one or more dimensions of the card 52, etc. In other embodiments, the markings 74 may correspond to alignment positions, spacing, and/or physical positioning of the plurality of cards 52 within the laminate sheet 50. For example, FIG. 10B illustrates a laminate sheet 50a including a reference marking 74b formed thereon. The reference marking 74b corresponds to a reference location on the laminate sheet 50a. The location and/or perimeter of each card 52 in the laminate sheet 52 can be determined based on calculations e.g., vectors, distances, etc.) from the reference marking 74b.

The markings 74 can include visible-spectrum and/or non-visible spectrum markings, such as ink and/or other printable markings formed on a surface of the laminate sheet 50, etching or other material markings formed on and/or through the laminate sheet 50, graphics, and/or any other suitable visible and/or non-visible marking. In some embodiments, the markings 74 include reactive materials configured to react to one or more wavelengths, reactive agents, and/or other reactive materials. Although specific embodiments are discussed herein, it will be appreciated that any number of markings (e.g., 1, 2, 3, 4, 5) can be formed on the laminate sheet 50 which can correspond to a portion of a card (such as an edge, corner, center, etc.), a perimeter of a card (e.g., continuous about a perimeter of the card), and/or a predetermined location on the laminate sheet 50 (e.g., one or more reference markings).

In some embodiments, visible-spectrum markings 74 include one or more graphics and/or other images formed on one or more of the laminate sheets 50. The graphics can include any suitable graphic placed on the card, such as finished graphics, partial graphics, etc. The graphics can correspond to and/or be formed with respect to one or more aspects of a card 52. The separation device 200 can be configured to use the graphics and/or images independently and/or in conjunction with other markings 74 to guide a singulation process, as discussed below.

In some embodiments, the locating device 100 is configured to generate a mapping file or other computer readable file indicative of a position of each card 52 within the laminate sheet 50. The mapping file can be provided to the separation device 200 to direct a singulation process, as discussed in greater detail below. The mapping file can include information identifying and/or corresponding to the location of each card 52 within a laminate sheet 50, such as, for example, spatial information (e.g., length, height, distance, spacing, etc.) of one or more cards 52 with respect to one or more reference marks formed on the laminate sheet 50 and/or edges of the laminate sheet 50, dimensional information of one or more cards 52, modification information (e.g., for adjusting relative positions of one or more cards 52 within a sheet template), and/or any other suitable information for calculating and/or determining a position of one or more cards 52 within a laminate sheet 50. It will be appreciated that any suitable digital file can be generated by the locating device 100 for use by the separation device 200. In some embodiments, the mapping file may include information regarding material density, material locations, material layers, and/or other material information to facilitate in tool selection during card singulation, which is discussed in greater detail below.

In one embodiment, the locating device 100 performs a physical modification of the laminate sheet 50 to assist the separation device 200 in identifying the locations of the cards 52 and/or singulating the cards 52. For example, in some embodiments, after identifying the location of a core layer 54 within the laminate sheet 50, the locating device 100 forms one or more physical modifications of the laminate sheet 50 at predetermined locations with respect to identified core layer 54. For example, one or more physical modifications may be formed at a predetermined distance from one or more corners of a core layer 54. Physical modifications may be formed with respect to each core layer 54 and/or a selected subset of the identified core layers 54. The physical modifications may include, but are not limited to, holes, etchings, channels, punches, etc. formed in and/or through the laminate sheet 50. In some embodiments, the physical modifications are used by the separation device 200 to identify the location of the cards 52. In addition, in some embodiments, the physical modifications (such as drilled holes) serve as a point of introduction of a singulation instrument (such as a bit) of the separation device 200 to the laminate sheet 50, as discussed in greater detail below. In some embodiments, each of the laminate sheets 50 is transferred from the locating device 100 to the separation device 200. Although locating device 100 and separation device 200 are shown as separate aspects in FIG. 9, it will be appreciated that the card manufacturing system 2 can be combined into a single device, in accordance with some embodiments and as further described herein.

The separation device 200 is configured to receive each of the laminate sheets 50 and separate each of the plurality of cards 52 from the laminate sheet 50. In some embodiments, the separation device 200 includes an imaging device configured to detect and/or otherwise image markings 74 and/or physical modifications formed by the locating device 100 on the laminate sheet 50. The imaging device can include a visible spectrum imaging device and/or a non-visible spectrum imaging device. In some embodiments, the markings 74 include reactive materials and the imaging device of the separation device 200 includes a light source configured to apply a predetermined wavelength to the reactive markings. Although specific embodiments are discussed herein, it will be appreciated that the imaging device of the separation device 200 can be any suitable imaging modality configured to detect the markings generated by the locating device 100. In some embodiments, the separation device 200 is configured to perform card separation (or singulation) based on the markings 74 and/or physical modifications formed on the laminate sheet 50 and/or a mapping file generated by the locating device 100.

The separation device 200 includes a singulation mechanism configured to remove material from the laminate sheet 50. The singulation mechanism is configured to remove surrounding material from each of the plurality of cards 52 formed in the laminate sheet 50. In some embodiments, the separation device 200 includes a plurality of singulation mechanisms configured to remove multiple cards 52 from the laminate sheet 50 simultaneously. In some embodiments, the singulation mechanism can include any suitable singulation mechanism, such as milling instrument including a rotating bit, a cutting edge, etc., a vertical milling machine and/or a horizontal milling machine, a laser cutter, water jet, ultrasonic wire cutter, and/or any other suitable singulation mechanism. The separation device 200 separates the plurality of cards 52 from the laminate sheet 50. After removal of the cards 52, the edges of each of the cards 52 can be finished to clean and/or round the edges. The finishing of the edges can include buffing, polishing, grinding, sanding, etc. Finishing may be performed by the separation device 200 and/or by a separate finishing device (not shown).

In some embodiments, the separation device 200 is configured to remove a portion of the core layer 54 during separation. In such embodiments, a core layer 54 is initially over-sized and/or larger than the final desired card 52 dimensions. By removing a portion of the core layer 54, the edges of the core layer 54 are exposed after singulation of the card 52. Additionally, by removing a portion of the core layer 54 during the singulation process, the surface finish of the edges of the core layer 54 can be controlled during the singulation process by selecting the geometry of a singulation instrument (or singulation mechanism) as well as parameters such as rotation speed (e.g., of milling instrument), the feed rate, etc. During separation, the singulation instrument may remove a minimal amount of material from each core layer 54. As a result, the singulation instrument is predominantly removing filler materials, such as PVC and EVA, which are generally softer than the core layers 54 and relatively easy to machine. The minimal amount of metal which is removed ensures that heat build-up is minimized and tool life of the singulation instrument/mechanism is maximized. In one embodiment, during singulation, less than 0.010" is removed from each edge of each core layer. In another embodiment, less than 0.005" is removed from each edge of each core layer. Although specific embodiments are discussed herein, it will be appreciated that the singulation mechanism can be configured to remove any amount of filler and/or core material from a card 52 during a singulation process.

In one embodiment, frame 65 is configured such that the space between each core layer is equal to, or just larger than, the cutting width of the milling instrument. As a result, only a single pass of the milling instrument is required to remove all of the material between adjacent core layers. For example, in some embodiments, the distance between adjacent core layers 54 may be substantially equal to a diameter of a singulation instrument. In other embodiments, the distance between adjacent core layers 54 may be substantially equal to a diameter of the singulation instrument minus a predetermined core layer removal amount. For example, in embodiments configured to remove 0.005" of core material from each edge of a core layer 54, the spacing between each core layer 54 may be equal to the diameter of the singulation instrument minus 0.01" to allow removal of the desired 0.005" of core layer 54 from each card 52 simultaneously.

In some embodiments, the separation device 200 is a computer-controlled separation device, such as a CNC (computer numeric controlled) machine. The separation device 200 is configured to automatically locate each of the plurality of cards 52 within a laminate sheet 50 based on the markings 74 formed by the locating device 100 and/or a mapping file generated by the locating device 100. In some embodiments, after identifying a marking 74 corresponding to a card 52 and/or locating a card 52 based on a mapping file, the separation device 200 automatically removes the surrounding material from the perimeter of the card 52 to release the card 52 from the laminate sheet 50. The markings 74 and/or the mapping file provide a guide for the automated separation device 200. The edges of the cards 52 are finished during the removal process. In some embodiments, the edges of the processed cards 52a include a molecular edge (or bond) such that the plurality of layers comprising each individual card 52a are not separable. After singulating (i.e., removing) each of the cards 52a from the laminate sheet 50, the remaining filler material can be discarded and the cards 52a provided for further processing and/or distribution.

In some embodiments, the separation device 200 includes separation mechanisms and/or instruments configured to be automatically interchanged during a card removal/singulation process. For example, in various embodiments, the separation mechanism can include a milling instrument having a plurality of interchangeable milling bits. One or more of the milling bits can be selected by the separation device 200 for initial removal, fine removal, finishing, and/or other processing of each of the cards 52 during card removal. In some embodiments, the separation device 200 may include multiple singulation mechanisms, such as a water jet, laser cutter, milling instrument, etc., that may be selectively applied to the laminate sheet 50 during card separation. For example, in some embodiments, the separation device 200 includes a first singulation mechanism configured to perform an initial singulation of each of the cards 52 during card removal and a second singulation mechanism configured to perform polishing and/or finishing of each of the cards 52. The first singulation mechanism may be configured to perform a rough or incomplete cut and the second singulation mechanism may be configured to perform a finishing or polishing cut to form a predetermined edge profile. In some embodiments, the first singulation mechanism includes a first milling bit and the second singulation mechanism includes a second milling bit, although it will be appreciated that the first singulation mechanism and/or the second singulation mechanism can include any suitable singulation mechanisms.

The card manufacturing system 2 is configured to process laminate sheets 50 containing cards of various widths, heights, and/or thicknesses. For example, in some embodiments, card manufacturing system 2 is configured to process laminate sheets 50 containing cards having a thickness of up to about 40 mils, although it will be appreciated that the card manufacturing system 2 can be configured to process cards having any suitable thickness. The card manufacturing system 2 is further configured to process laminate sheets 50 including cards 52 having variable widths and/or heights. In some embodiments, the locating device 100 is configured to image each card 52 and provide markings 74 and/or a mapping file corresponding to the position of each card. In some embodiments, the markings further correspond to the width and/or height of the individual cards. The separation device 200 is guided by the markings and/or mapping file and can process cards 52 having various widths and heights without needing to retool and/or reconfigure the separation device 200. In some embodiments, a reference location is identified by a marking 74b and the separation device 200 operates based on calculated and/or known positions of the core layers 54 within the laminate sheet 50 with respect to the reference location. The calculations and/or known positions may be included in, for example, a mapping file generated by the locating device 100.

In some embodiments, the separation device 200 is configured to generate additional and/or alternative processing and/or milling in one or more cards 52 on the laminate sheet 50. For example, in some embodiments, the separation device 200 is configured to perform aesthetic milling to generate one or more milled images, features, signatures and/or other aesthetic elements on one or more cards 52. The aesthetic milling can occur prior to, simultaneously with, and/or after removal of the surrounding material from the periphery of the card 52. In some embodiments, markings 74 and/or a mapping file generated during the inspection process are used to form aesthetic elements during the separation process. In some embodiments, the separation device 200 is configured to locate the aesthetic elements based on original markings and/or additional imaging systems formed integrally with the separation device 200.

In some embodiments, the separation device 200 is configured to remove a portion of material from within a periphery of one or more of the cards 52 during the separation process. For example, in some embodiments, the separation device 200 is configured to remove a portion of material from within a card 52 for positioning one or more additional materials, elements, and/or other devices within the card 52. For example, in some embodiments, the separation device 200 is configured to generate channels for EMV chips. As another example, in some embodiments, the separation device 200 is configured to remove a portion of material to allow positioning of an additional material/object within the periphery of the card 52. In some embodiments, the separation device 200 is configured to form one or more channels, cutouts, and/or other discontinuities in a card 52.

FIGS. 11-17 show one embodiment of a card manufacturing system 2 in which the locating device 100 and the separation device 200 share a common worktable 202. The card manufacturing system 2 includes a worktable 202, one or more transport arms 204 mounted on a transport rail 206, an x-ray source 208, an x-ray receiver 210, and a spindle 212 mounted to a gantry 214. A loading station 300 is positioned at a first end of the card manufacturing system 2 and an unload station 400 is positioned at a second end of the card manufacturing system 2. In some embodiments, a discard station 500 is positioned near the second end for collecting discarded portions of the laminate sheet 50, as will be described further herein.

The transport arm 204 is configured to travel horizontally along the transport rail 206 and/or to vertically raise and lower relative to the transport rail 206. The transport arm 204 is configured to move a laminate sheet 50 from the loading station 300 to the worktable 202. Subsequently, after separation of the cards 52, the transport arm 204 is configured to move the singulated cards from the worktable 202 to the unload station 400. In the illustrated embodiment, the transport arm 204 also moves the remainder of the excess portions of the laminate sheet 50 to the discard station 500. The transport arm 204 may use any suitable system to engage the laminate sheet 50 and/or cards 52 during transportation, such as, for example, a vacuum system. Although embodiments are discussed herein including a single transport arm 204, it will be appreciated that the card manufacturing system 2 can include any number of transport arms 204, for example, one, two, three, or more transport arms.

Figure 15:
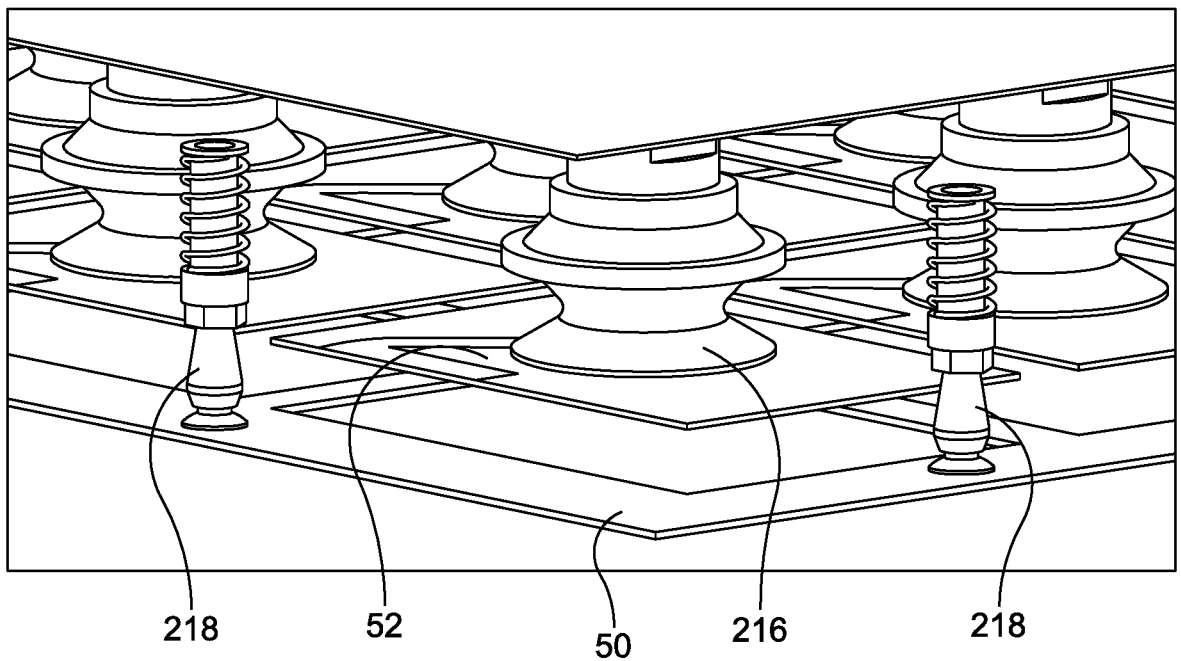
FIG. 15 illustrates vacuum cups of the transport arm engaged with cards and the frame of the laminate, in accordance with some embodiments.

In the illustrated embodiment, as shown best in FIG. 15, the transport arm 204 includes a plurality of vacuum cups including card vacuum cups 216 and frame vacuum cups 218. The card vacuum cups 216 are positioned to generally correspond to an area of the cards 52 within the laminate sheet 50 when the transport arm 204 is aligned with each laminate sheet 50. The frame vacuum cups 218 are positioned such that they generally align with the laminate sheet 50 between or around the cards 52 when the transport arm 204 is aligned with the laminate sheet 50. The card vacuum cups 216 and frame vacuum cups 218 can be connected to a common vacuum source and/or one or more of the card reference cups 216 can be operatively connected to a first vacuum source 220 and one or more the frame vacuum cups 218 can be operatively connected to a second vacuum source 222 (as shown in FIG. 9). In the illustrated embodiment, the card vacuum cups 216 may be of a larger size (e.g. diameter) than the frame vacuum cups 218, however, any relationship in size is contemplated within the scope of this disclosure. For example, the card vacuum cups 216 may be larger than, smaller than, or equal to the frame vacuum cups 218. The vacuum cups 216, 218 may include a material configured to prevent marking, scratching, and/or other defacing of the cards 52. For example, in some embodiments, one or more of the vacuum cups 216, 218 may include a silicon, rubber, and/or other material configured to prevent marking of the cards 52. Although embodiments are discussed herein including a vacuum coupling system, it will be appreciated that the transport arm 204 can use any suitable mechanism for moving a laminate sheet 50 and/or singulated cards 52 into and/or out of various elements of the card manufacturing system 2. For example, in various embodiments, the card manufacturing system 2 may use belts, rollers, electromagnets, and/or any other suitable transport systems.

Figure 12:
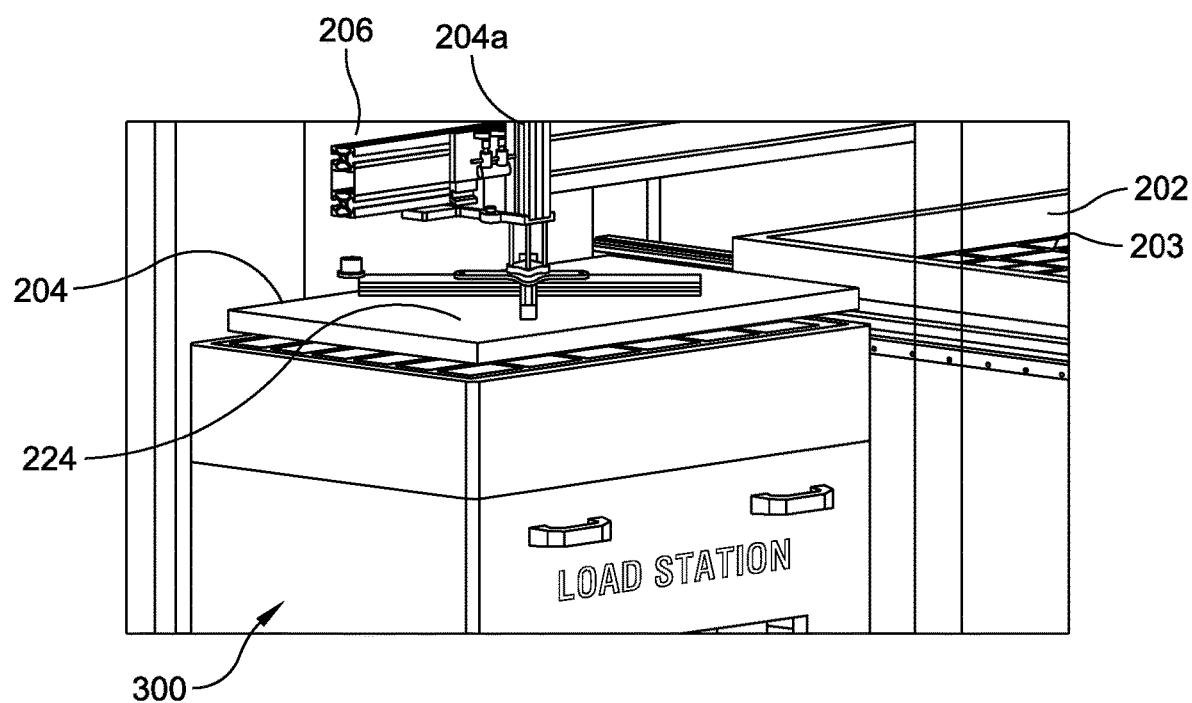
FIG. 12 illustrates a transport arm of the card manufacturing system of FIG. 11 engaging a laminate, in accordance with some embodiments.

To begin a cycle of the card manufacturing system 2, the transport arm 204 is positioned above the loading station 300. The transport arm 204 is lowered such that one or more of the vacuum cups 216, 218 contacts the top laminate sheet 50 on the loading station 300, as shown in FIG. 12. A vacuum is initiated to secure the vacuum cups 216, 218 to the laminate sheet 50. For example, a vacuum may be applied to the card vacuum cups 216 and/or the frame vacuum cups 218 to couple the laminate sheet 50 to the transport arm 204. The transport arm 204 is then raised to lift the laminate sheet 50 from the loading station 300. The transport arm 204 may be moved in a predetermined fashion, such as being repeatedly raised and lowered, to ensure that only one laminate sheet 50 is secured. The transport arm 204 then translates along transport rail 206 such that the laminate sheet 50 is aligned over the worktable 202. The transport arm 204 is then lowered to position the laminate sheet 50 on the worktable 202. The vacuum in transport arm 204 may then be reduced or eliminated to release the laminate sheet 50. Although embodiments are discussed herein having a raised transport rail 206, it will be appreciated that the transport rail 206 can be positioned at any suitable location to allow the transport arm 204 to transverse over and/or with respect to the worktable 202.

Figure 13:
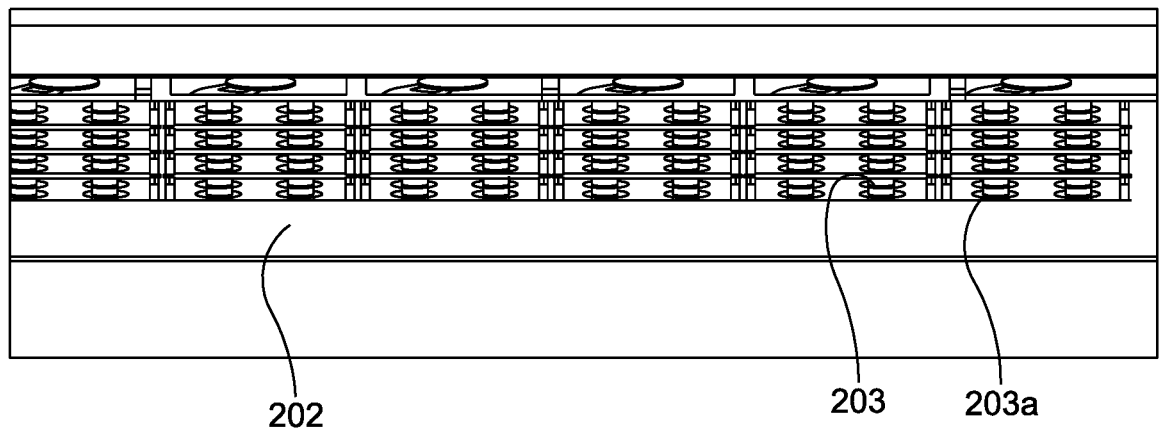
FIG. 13 illustrates a vacuum fixture of the card manufacturing system of FIG. 11, in accordance with some embodiments.

In some embodiments, the worktable 202 is configured to fix the laminate sheet 50 in place. For example, in some embodiments, the worktable 202 includes a vacuum fixture 203. The vacuum fixture may have one or more vacuum channels 203a positioned such that at least one vacuum channel 203a is generally located under each card 52 of the laminate sheet 50 when the laminate sheet 50 is positioned on the worktable 202. In one embodiment, as shown in FIG. 13, the vacuum fixture includes four circular vacuum channels 203a each configured to be generally positioned under card 52 in a laminate sheet 50, although it will be appreciated that any number of vacuum channels can be used. For example, a single rectangular vacuum channel can be configured to be positioned around the periphery of each card 52. In some embodiments, the vacuum fixture includes a plurality of vacuum holes positioned such that the vacuum holes are generally located under the portion of the laminate sheet 50 without any cards 52 (e.g., the "frame" of the laminate sheet 50). The vacuum fixture ensures that the laminate sheet 50 is securely held in place during imaging and separation. For example, the plurality of vacuum holes apply a vacuum force to the frame of the laminate sheet 50 to further stabilize the frame, reduce vibration and chatter during card singulation, and improve the separation results and/or smoothness of a finished edge of each card. The vacuum fixture may include a vacuum foot (or contact foot) formed of a material configured to protect the cards 52. Although embodiments are discussed herein including a vacuum fixture integrated with the worktable 202, it will be appreciated that additional and/or alternative coupling mechanisms may be employed to maintain a position of the laminate sheet 50 with respect to the worktable 202. For example, in various embodiments, the worktable 202 may include one or more clamps, fixtures and/or other coupling mechanism configured to maintain the laminate sheet 50 in a fixed position with respect to the worktable 202.

The worktable 202 may be movable along one or more axes. For example, the worktable may be movable along a y-axis such that in an extended position the worktable 202 is generally positioned beneath the transport rail 206. From this extended position, the worktable 202 may translate along the y-axis to a retracted position for further processing of the laminate sheet 50. In other embodiments, the worktable 202 may translate on an x-axis to transfer a laminate sheet 50 from the locating device 100 to the separation device 200.

Figure 14:
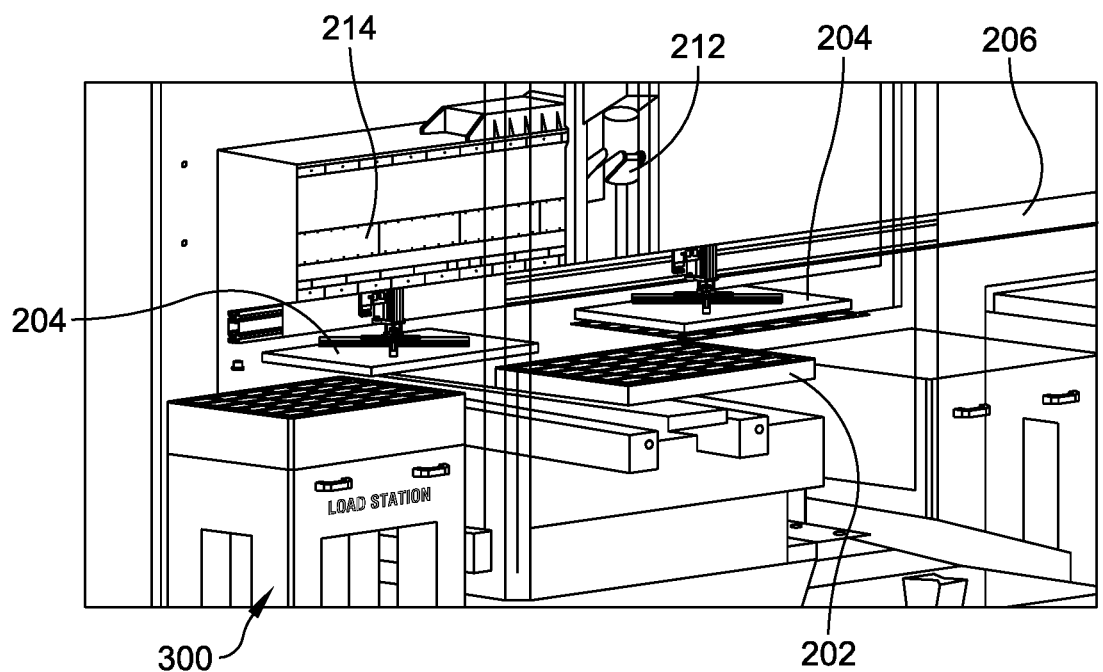
FIG. 14 illustrates an isometric view of the card manufacturing system of FIG. 11, in accordance with some embodiments.
Figure 16:
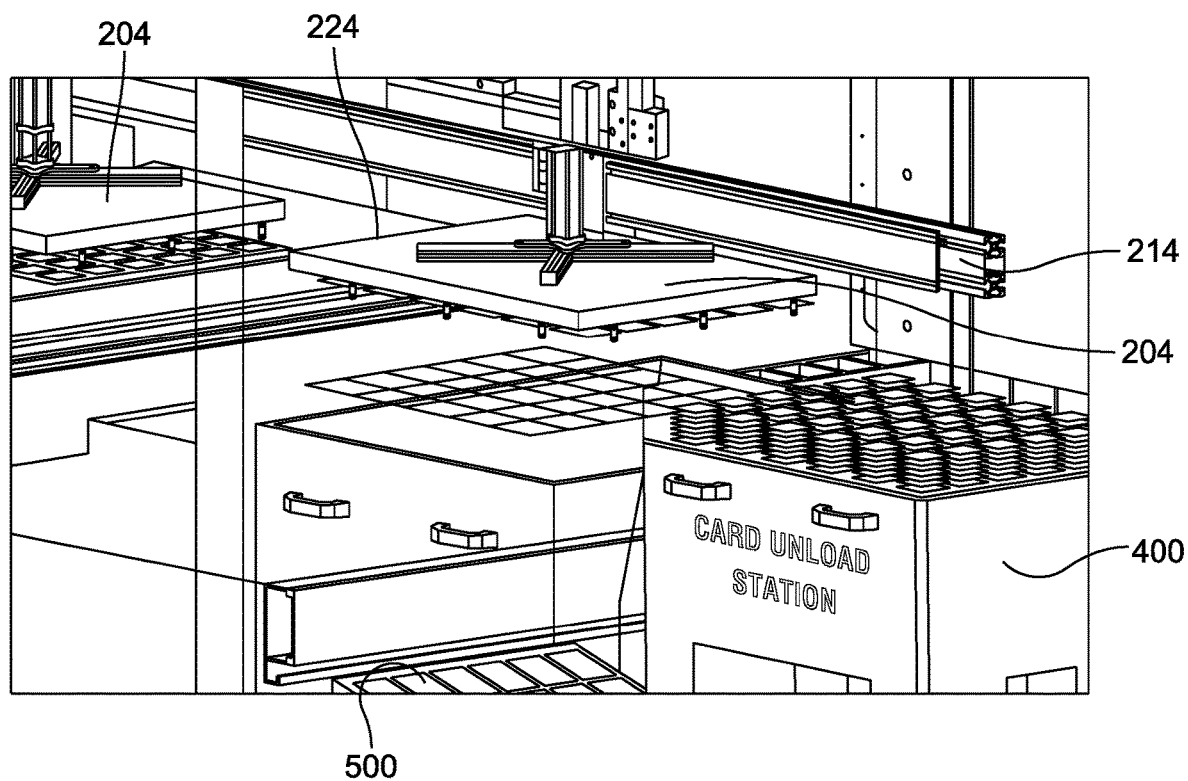
FIG. 16 illustrates the frame being transported to a discard station of the card manufacturing system of FIG. 11, in accordance with some embodiments.
Figure 17:
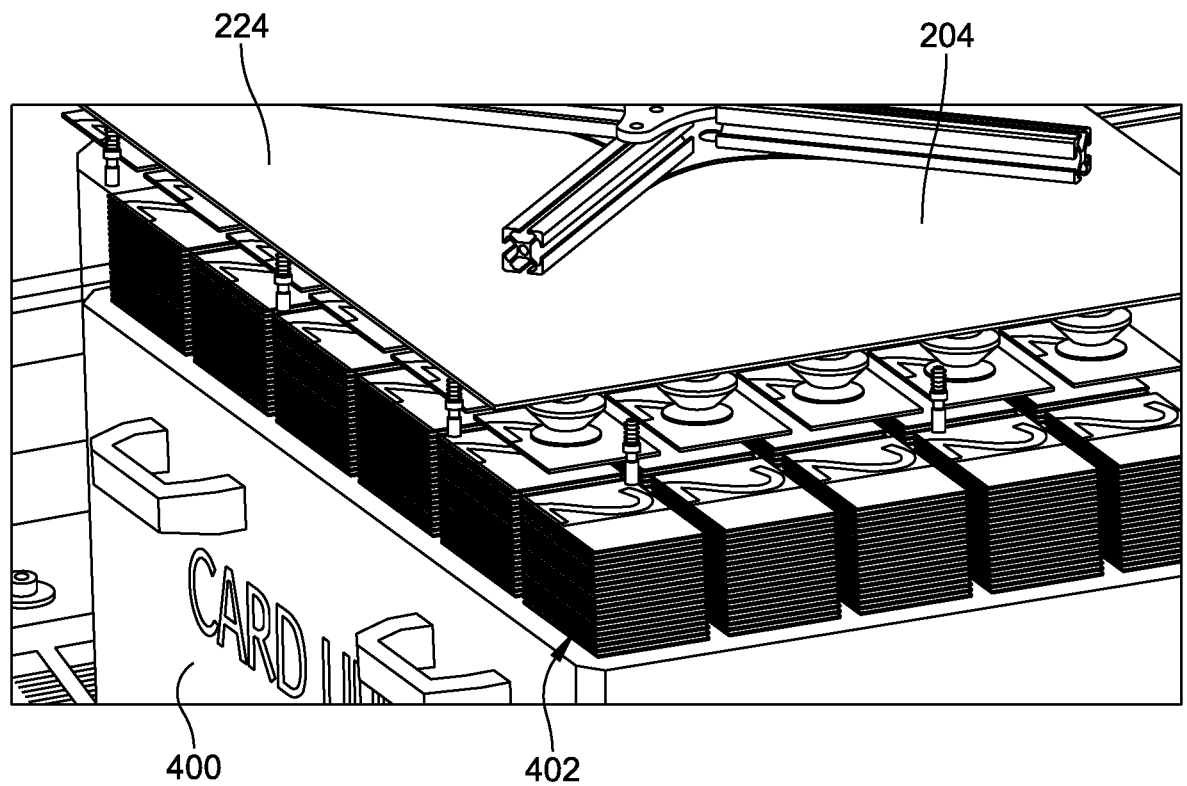
FIG. 17 illustrates the cards being transported to the unload station of the card manufacturing system, in accordance with some embodiments.

After the cards are singulated, for example, the worktable 202 returns to the extended position. The transport arm 204 is again positioned over the worktable 202 and lowered to engage the cards 52 and remaining portion of the surrounding material. In some embodiments, the card vacuum cups 216 engage the singulated cards 52 and the frame vacuum cups 218 engage the remainder of the laminate sheet 50. The transport arm 204 is then raised, as shown in FIG. 14, and translated to a position above the discard station 500. At this location, the vacuum in the frame vacuum cups 218 is reduced or terminated. As a result, the remaining portion of the laminate sheet 50 is released and allowed to fall into the discard station 500, as shown in FIG. 16. The transport arm 204 is then positioned above the unload station 400, as shown in FIG. 17. In this position, the vacuum in the card vacuum cups 216 is reduced or terminated. As a result, each of the cards 52 is able to fall into the unload station 400. The unload station 400 can include sleeves 402 into which the cards fall, thereby separating the cards into individual stacks. This may allow for easy handling and sorting of the cards at later stages of production.

In at least one embodiment, the card manufacturing system 2 includes two transport arms 204 (shown in FIG. 9), each having a set of card vacuum cups 216 and a set of frame vacuum cups 218. The first transport arm transports sheets from the loading station 300 to the worktable 202. The second transport arm transports the separated cards and remaining portions of the laminate sheets 50 to the unloading station 400 and discard station 500, respectively. In this way, the transport arms 204 can operate simultaneously, thereby increasing the speed and efficiency with which the card manufacturing system 2 operates.

Each of the vacuum cups 216, 218 can be mounted to a common platform 224 which moves the vacuum cups 216, 218 vertically and/or horizontally in unison. In such an embodiment, the platform 224 may be mounted to one or more pneumatic or hydraulic cylinders 204a which allow vertical movement relative to the transport rail 206. Alternatively, the platform can be mounted to one or more drive screws operated by an electric motor, such as an AC motor, a DC motor, or a stepper motor. It will be appreciated that any suitable mechanism can be configured to move the common platform 224 on one or more axes.

Alternatively, the vacuum cups 216, 218 may be configured to operate independently. In such an embodiment, each vacuum cup 216, 218, and/or a group of vacuum cups, can be coupled to a pneumatic or hydraulic cylinder or a motor-driven drive screw. Such an embodiment may be used in cases where the number of cards on a sheet varies, thereby allowing flexibility in the card manufacturing system 2.

In some embodiments, each of the loading station 300, unloading station 400, and/or discard station 500 can be provided with wheels or other means for moving the stations. This allows an operator to easily place or remove the stations 300, 400, 500 when they are empty or full.

Figure 18:
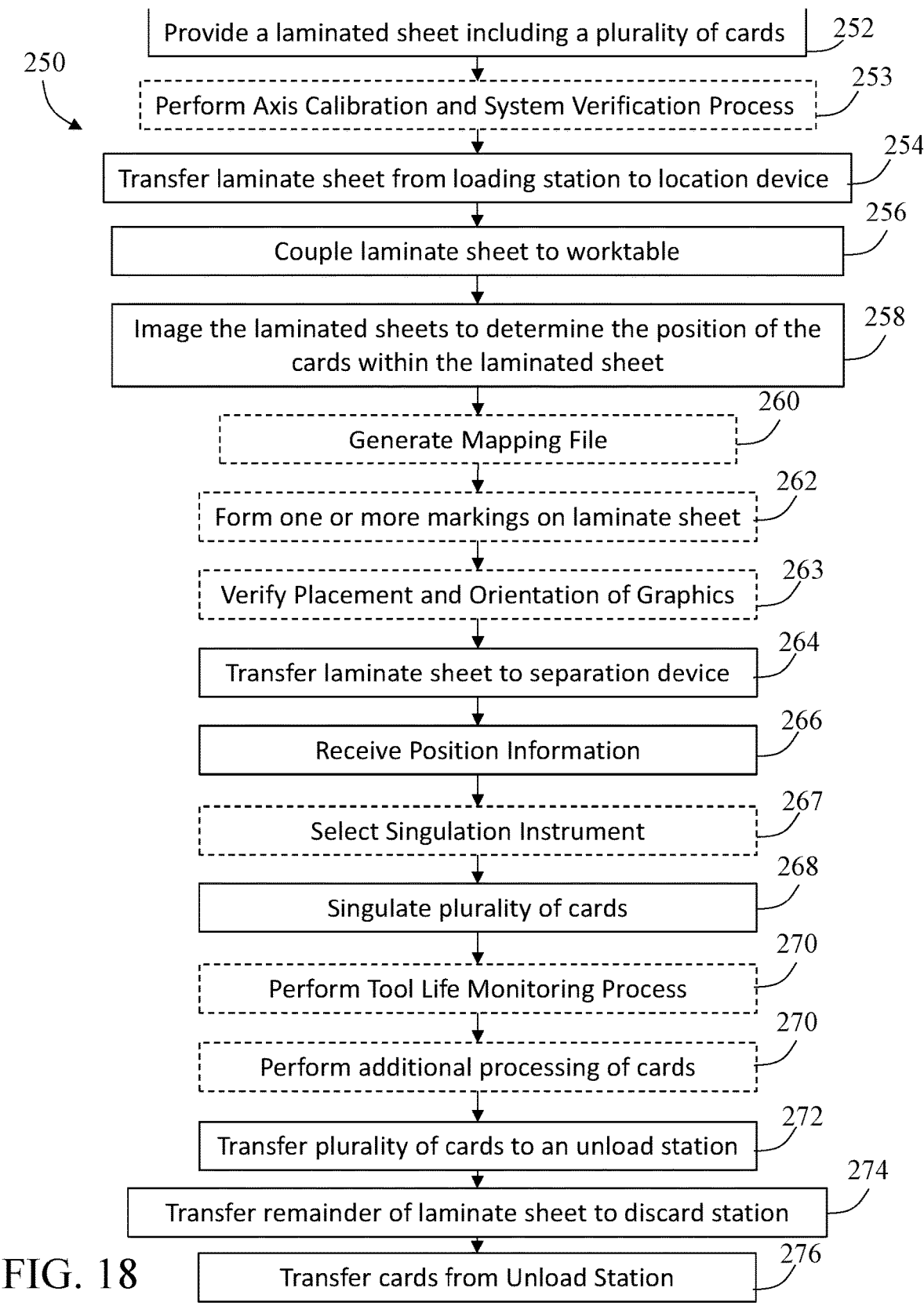
FIG. 18 is a flowchart illustrating a method of forming a card using the card manufacturing system of FIG. 1, in accordance with some embodiments.

A method 250 of singulating a plurality of cards 52 is shown in FIG. 18. The method 250 may be implemented by a card manufacturing system 2 as discussed and described above. At step 252, at least one laminated sheet 50 is provided to a loading station 300 positioned adjacent to and/or at a predetermined position with respect to a locating device 100 of a card manufacturing system 2. In some embodiments, the at least one laminated sheet 50 may be provided to the loading station 300 at a location remote from the locating device 100 and delivered to the locating device 100 in conjunction with the loading station 300. In other embodiments, the laminate sheet 50 may be provided to a loading station 300 permanently and/or temporarily positioned adjacent to the locating device 100 prior to delivery of the laminate sheet 50.

At optional step 253, an axis calibration and/or system verification may be performed. In some embodiments, the locating device 100, separation device 200, transport arms 204, and/or any other suitable element may use one or more known or fixed locations to calibrate one or more elements to a known-zero location. For example, in some embodiments, the locating device 100 may be configured to take an initial image without a laminate sheet 50 to confirm operation and positioning of an imaging element prior to imaging a laminate sheet 50. Similarly, the separation device 200 may position a singulation tool at a known location corresponding to a "zero" location of the singulation tool. It will be appreciated that any suitable calibration and/or system verification may be performed prior to processing one or more laminate sheets.

At step 254, the laminate sheet 50 is transferred from the loading station 300 to a predetermined position within the locating device 100. For example, in some embodiments, the laminate sheet 50 is transferred to a predetermined position on a worktable 202 formed integrally with and/or positioned at a locating device 100. The laminate sheet 50 may be transferred using any suitable mechanism. For example, in some embodiments, the laminate sheet 50 is transferred by a transport arm 204 including one or more vacuum cups 216, 218 configured to apply vacuum suction to the laminate sheet 50 to couple the laminate sheet 50 to the transport arm 204. In other embodiments, the laminate sheet 50 may be transferred by a transport arm 204 including any suitable coupling mechanism such as a vacuum coupling mechanism, a clamping mechanism, a grasping mechanism. In still other embodiments, the laminate sheet 50 may be transferred by a transfer mechanism such as a conveyor belt, pusher, and/or any other suitable mechanism. In an exemplary embodiment, the laminate sheet 50 is positioned at a predetermined position on the worktable 202.

At step 256, the laminate sheet 50 is coupled to the worktable 202 (or other surface of the locating device 100). The laminate sheet 50 can be coupled to the worktable 202 by any suitable mechanism, such as a vacuum system 203 formed integrally with the worktable 202. The vacuum system 203 can include a plurality of vacuum channels 203a extending within the worktable 202 and positioned below a portion of the laminate sheet 50. The vacuum system 203 is configured to apply a vacuum through the plurality of vacuum channels 203a to couple the laminate sheet 50 to the worktable 202. In other embodiments, a mechanical clamping mechanism and/or other coupling device may be used to couple the laminate sheet 50 to the worktable 202. In some embodiments, the vacuum system 203 includes a foot 205 configured to contact the laminate sheet 50 and/or the cards 52. The vacuum foot 205 can include any suitable material, such as a bristle brush, felt, and/or any other suitable material.

At step 258, the laminate sheet 50 is imaged to determine the position of the cards 52 within the laminate sheet 50. Step 258 can be performed by the locating device 100 described herein. In some embodiments, as discussed above, the imaging is performed in a non-visible spectrum, such as x-ray imaging, ultrasound, infrared, electromagnetic, microwave, etc. The locating device 100 is configured to identify the position of each of the plurality of cards 52 within the laminate sheet 50. For example, the locating device 100 may be configured to identify the absolute position of each of the plurality of cards 52 within the laminate sheet 50 and/or may be configured to identify a relative position of each of the plurality of cards 52 with respect to at least one reference point of the laminate sheet 50.

At optional step 260, a mapping file containing mapping information for the laminate sheet 50 is generated. The mapping file can include a digital file identifying a position (either absolute or relative) of each of the plurality of cards 52 within the laminate sheet 50. Alternatively, the mapping file may include a reference point, one or more vectors for identifying an edge or other reference for each of the plurality of cards 52, and dimension information for each of the plurality of cards 52. Although specific embodiments are discussed herein, it will be appreciated that the mapping file can include any suitable format for identifying the position of each of the plurality of cards 52 within the laminate sheet 50 and directing a separation mechanism of the separation device 200 to singulate each card 52.

At optional step 262, the locating device 100 forms one or more markings and/or physical alterations on the laminate sheet 50. The markings 74 and/or physical alterations may correspond to a reference position and/or a position of at least one card. The markings 74 can include visible markings (such as printed markings formed by a visible ink and/or etching), non-visible markings (such as printed markings formed by non-visible spectrum ink), and/or reactive markings (such as printed markings formed by ultraviolet or other light reactive ink). The physical alterations can include, but are not limited to, holes, etching, trenches, channels, etc. formed in and/or through the laminate sheet 50. The markings 74 and/or the physical alterations may be used, either alone or in combination with a mapping file, by a separation device 200 for positioning and/or guiding a singulation instrument. In some embodiments, the markings 74 and/or the mapping file may include information regarding the laminate sheet 50, such as, for example, the number of cards 52 included in the laminate sheet 50, the size of various cards 52 contained within the laminate sheet 50, and/or any other suitable information regarding the laminate sheet 50 and/or the cards 52.

At optional step 263, the locating device 100 is configured to verify placement, orientation, and/or other features of graphics formed on the individual cards 52 within the laminate sheet 50. In some embodiments, the locating device 100 includes an imaging modality configured to image the laminate sheet 50 in a first wavelength, such as a visual spectrum imaging modality, and an imaging modality configured to image the laminate sheet 50 in a second wavelength, such as an x-ray or other non-visible imaging modality. The locating device 100 is configured to overlay or otherwise combine imaging data generated from the first imaging modality with imaging data generated by the second imaging modality to verify placement, orientation, and/or configuration of one or more graphics. For example, in some embodiments, the locating device 100 is configured to determine if a graphic is positioned substantially over a card 52 within the laminate sheet and/or whether a portion of the graphic is correctly positioned with respect to some element within the card 52, such as, for example, a discontinuity or cavity. In some embodiments, the locating device 100 rejects the laminate sheet 50 if the cards 52 and graphics are not aligned within a predetermined margin of error.

At step 264, the laminate sheet 50 is transferred from the locating device 100 to the separation device 200. The laminate sheet 50 may be transferred by any suitable transfer mechanism, such as, for example, a transfer arm 204 configured to be releasably coupled to the laminate sheet 50. The transfer arm 204 may be the same transfer arm 204 used to transfer the laminate sheet 50 from the loading station 300 and/or a different transfer arm 204. In other embodiments, the transfer mechanism may include a conveyor belt, push mechanism, grasping mechanism, and/or any other suitable transfer mechanism. In some embodiments, a worktable 202 is configured to transfer the laminate sheet 50 from the locating device 100 (or a portion of a shared housing including the locating device 100) to the separation device 200 (or a portion of a shared housing including the separation device 200). The worktable 202 may be configured to transfer the laminate sheet 50 in a direction transvers to the direction of travel of the transfer arm 204.

At step 266, the separation device 200 receives position information for one or more cards 52 and determines the location of one or more cards 52 within the laminate sheet 50. For example, in embodiments in which the locating device 100 generates a mapping file, the separation device 200 is configured to receive the mapping file into memory and identify a position of one or more cards 52 within the laminate sheet 50. As another example, in some embodiments, the separation device 200 is configured to use markings 74 placed on the laminate sheet 50 by the locating device 100 to identify the position of each of the plurality of cards 52 within the laminate sheet 50. For example, in various embodiments, the separation device 200 includes an imaging device configured to image and/or identify the markings 74 formed on the laminate sheet 50. The imaging modality may be configured to image the markings 74 in a visible and/or non-visible spectrum. In another embodiment, the separation device 200 is configured to identify one or more surface markings and/or holes formed in the laminate sheet 50 by the locating device 100.

At optional step 267, the separation device 200 selects a singulation instrument or tool from a plurality of singulation instruments or tools. For example, in some embodiments, the imaging device 100 is configured to generate material information in addition to position information and/or additional information generated during steps 258 and 260. The material information may include, but is not limited to, material density, material type, material hardness, layering information, and/or any other suitable material information. The separation device 200 is configured to select a singulation tool based on the material information and/or predetermined tool designations. For example, in some embodiments, the separation device 200 is configured to select a first singulation tool or instrument, such as a bit having a first profile and a first size, for a first material, such as PET, and a second singulation tool or instrument, such as a bit having a second profile and/or a second size, for a second material. In some embodiments, the separation device 200 is configured to perform optional step 267 multiple times to select different tools for different portions of the laminate sheet 50 containing different materials. In various embodiments, the singulation tool may include a profile such as a tapered profile, an hourglass profile, a cylindrical profile, a fluted profile, and/or any other suitable profile or combination thereof.

At step 268, each of the plurality of cards is singulated. The cards 52 may be singulated by a separation device 200 as discussed above. For example, in some embodiments, a separation device 200 includes a singulation instrument that is guided and/or positioned based on the plurality of card 52 positions identified by the locating device 100. The singulation instrument may be guided optically (e.g., using markings formed on the laminate sheet 50) and/or digitally (e.g., using a mapping file previously generated for the laminate sheet 50). In some embodiments, the singulation instrument includes a plurality of bits or cutting instruments configured to remove filler material and/or material to separate each card 52 from the laminate sheet 50. The separation device 200 may select a bit and/or cutting instrument based on information included in the mapping file, for example, information regarding the material of the core layers 54 and/or the filler material, the position of each card 52 within the laminate sheet 50, the dimensions of each card, and/or any other suitable information.

At optional step 269, a tool life monitoring process is performed to measure the remaining and/or used tool life of the singulation instrument used at step 268. In some embodiments, the tool life monitoring process measures one or more dimensions of a singulation instrument to determine the remaining life on the singulation instrument. For example, in some embodiments, a diameter of the singulation instrument may be measured to determine the remaining tool life of the singulation instrument. In other embodiments, the separation device 200 is configured to maintain a run-time or card-count related to the total amount of time and/or the total number of cards removed from laminate sheets 50. Each singulation instrument may have a predetermine run-time life and/or predetermined material removal life. In some embodiments, the tool life may be adjusted based on material information received from the location device 100.

At optional step 270, additional processing and/or milling of one or more cards 52 is performed to form cavities, spacing, etchings, and/or other physical features on the card 52. In some embodiments, the singulation instrument and/or an additional tool (such as an additional and/or alternative milling bit) may be used to further finish the edges and/or remove additional material from one or more of the cards 52. The additional processing and/or milling can be performed prior to, during, and/or after singulation of the cards 52. For example, the edges of each card 52 can be ground, sanded, polished, or otherwise finished. This finishing process can provide desirable surface finishes on the edge of the card.

At step 272, the plurality of cards 52 are transferred from the separation device 200 to an unload station 400. For example, in some embodiments, each of the plurality of cards 52 interact with a vacuum cup 216 formed on a transfer arm 204. A predetermined vacuum level is applied to each of the vacuum cups 216 to couple the cards 52 to the transfer arm 204. The transfer arm 204 is moved from the separation device 200 to a position corresponding to the unload station 400. After positioning the transfer arm 204, the vacuum pressure is reduced or eliminated, and the cards 52 are separated from the vacuum cups 216. In some embodiments, the cards 52 are deposited into racks or other containers.

At step 274, the remainder of the laminate sheet 50 is transferred from the separation device 200 to a discard station 500. For example, in some embodiments, the remainder of the laminate sheet 50 interacts with at least one frame vacuum cup 218 formed on a transfer arm 204. A predetermined vacuum level is applied to each of the vacuum cups 218 to couple the remainder of the laminate sheet 50 to the transfer arm 204. The transfer arm 204 is moved from the separation device 200 to a position corresponding to the discard station 500. After positioning the transfer arm 204, the vacuum pressure is reduced or eliminated, and the remainder of the laminate sheet 50 is separated from the vacuum cups 218. At step 276, the plurality of cards 52 may be transferred from the unload station 400 for further processing and/or programming.

In some embodiments, the card manufacturing system 2 includes one or more circuit elements configured for controlling, monitoring, and/or otherwise operating the elements of the card manufacturing system 2. For example, in various embodiments, one or more elements of the card manufacturing system 2 may include one or more processors configured to be programmed to operate one or more predetermined functions and/or processes of the card manufacturing system 2.

Figure 19:
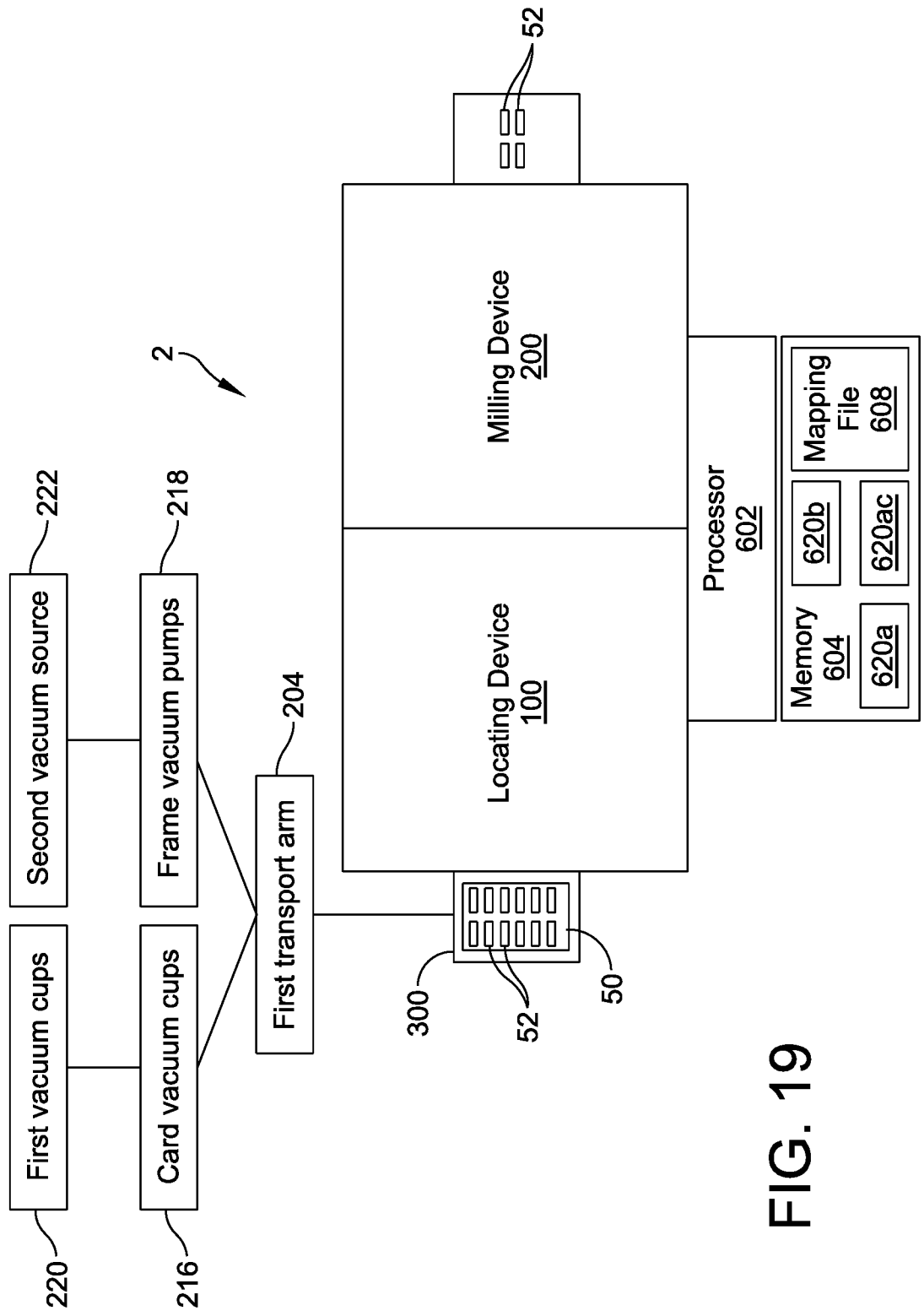
FIG. 19 illustrates a block-diagram of a control system of a card manufacturing system, in accordance with some embodiments.

FIG. 19 illustrates a block diagram of a card manufacturing system 2a illustrating various signal connections therein, in accordance with some embodiments. In the illustrated embodiment, the card manufacturing system 2a includes a processor 602 and a non-volatile memory module 604 in signal communication with each of the locating device 100, the separation device 200, and the transfer arm 204. In some embodiments, the processor 602 is configured to implement one or more processes and/or methods, such as, for example, the method 250 discussed above.

In some embodiments, the processor 602 is in signal communication with one or more elements of the locating device 100a. For example, in the illustrated embodiment, the processor 602 is in signal communication with an imaging modality 606 formed integrally with the locating device 100a. As discussed above, the imaging modality 606 is configured to generate an image of the laminate sheet 50, for example, in a non-visible spectrum. The imaging modality 606 transmits the image data to the processor 602.

The processor is configured to receive the imaging data from the imaging modality 606 and generate a mapping file 608 of the laminate sheet 50. The mapping file 608 may be stored in the non-volatile memory module 604. In some embodiments, the processor 602 is configured to utilize the mapping file 608 (and/or the imaging data received from the imaging modality 606) for directing one or more additional operations of the locating device 100. For example, in some embodiments, the processor 602 is in signal communication with a marking instrument 610 configured to generate at least one marking 74 on the laminate sheet 50. As discussed above, the marking instrument 610 can be configured to generate any suitable visible, non-visible, and/or reactive marking on the laminate sheet 50.

In some embodiments, the processor 602 is in signal communication with the transfer arm 204. The processor 602 is configured to operate the transfer arm 204 to transfer the laminate sheet 50 from a first station to a second station in response to one or more trigger conditions. For example, in some embodiments, in response to an initialization or begin condition, the processor 602 operates the transfer arm 204 to transfer a laminate sheet 50 from a loading station 300 to the locating device 100a. As another example, in some embodiments, in response to generating a mapping file 608, the processor 602 operates the transfer arm 204 to transfer a laminate sheet 50 from the location device 100a to the separation device 200a. Although embodiments are discussed herein including a single transfer arm 204 operated by the processor 602, it will be appreciated that any number of transfer arms 204 can be controlled by the processor 602 to move multiple laminate sheets 50 in parallel and/or series.

In some embodiments, the processor 602 is configured to provide the mapping file 608 to the separation device 200a and/or to calculate one or more inputs for the separation device 200a based on the mapping file 608. For example, as discussed above, the separation device 200a is configured to singulate one or more cards contained within the laminate sheet 50. The separation device 200a is configured to utilize the image data contained in the mapping file 608 to guide a singulation tool when singulating one or more cards, as discussed above.

In various embodiments, the non-volatile memory module 604 is configured to store a plurality of programs 620a-620c. Each of the plurality of programs 620a-620c is configured to calibrate the location device 100 and/or the separation device 200 for a laminate sheet 50 having one or more selected parameters, such as, for example, a predetermined core material, filler material, card dimension, card number, laminate sheet dimensions, and/or any other selected parameters. For example, in various embodiments, the plurality of programs 620a-620c include programs specific to one or more core materials, such as, for example, metal core materials, high density core materials, and/or other core materials. In other embodiments, the plurality of programs 620a-620c includes one or more programs configured to account for material inlays, aesthetic and/or functional cuts formed in one or more cards, and/or any other suitable card features.

Rectangular shaped information carrying cards or smart cards in this disclosure are for illustration only. The disclosed structure and process of making also apply to any information carrying card or part of any shapes and any size. Examples of these parts include but are not limited to rectangular sheets, circular sheets, strips, rods, and rings. The size includes but is not limited to any size following: ISO/IEC 7810 standard.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method of manufacturing, comprising:
receiving a laminate sheet comprising a plurality of information carrying cards formed integrally therein;
imaging the laminate sheet using a first imaging modality to identify a location of each of the plurality of information carrying cards within the laminate sheet;
imaging the laminate sheet using a second imaging modality to image at least one graphic formed on a surface of the laminate sheet;
determining a position of the at least one graphic with respect to at least one of the plurality of information carrying cards within the laminate sheet;
generating information corresponding to the location of each of the plurality of information carrying cards; and
separating the plurality of information carrying cards from the laminate sheet using the information corresponding to the location of each of the plurality of information carrying cards, wherein the generating and separating is performed only when the position of the at least one graphic with respect to the at least one of the plurality of information carrying cards is within a predetermined range.

2. The method of claim 1, wherein the laminate sheet is formed by a method comprising:
receiving a frame defining a plurality of cavities, wherein the frame comprises a first material;
positioning at least one core layer within at least one of the plurality of cavities, wherein the at least one core layer comprises a second material, and wherein the second material includes a metal;
forming a printed layer above the at least one core layer;
positioning a layer including the graphic above the printed layer; and
laminating the frame, the at least one core layer, the layer including the graphic, and the printed layer to generate at least one information carrying card.

3. The method of claim 1, wherein the first imaging modality comprises a non-visible spectrum imaging modality.

4. The method of claim 1, wherein generating the information corresponding to the position of each of the plurality of information carrying cards comprises forming at least one marking on the laminate sheet, wherein the at least one marking corresponds to the position of at least one of the plurality of information carrying cards, and wherein the at least one marking is formed away from the at least one graphic.

5. The method of claim 1, wherein generating the information corresponding to the position of each of the plurality of information carrying cards comprises generating a mapping file comprising position data corresponding to the position of at least one of the plurality of information carrying cards.

6. The method of claim 1, wherein separating the plurality of information carrying cards comprises guiding a singulation instrument to remove material from a periphery of each of the information carrying cards in the laminate sheet, wherein the singulation mechanism is guided by the information corresponding to the position of each of the plurality of information carrying cards.

7. The method of claim 6, wherein a predetermined portion of each of the information carrying cards is removed from the periphery of the information carrying card by the singulation mechanism and wherein the at least one graphic is positioned away from the periphery of the information carrying card.

8. The method of claim 7, wherein the predetermined portion is selected such that an edge of a core layer of the information carrying card is exposed after the information carrying card is removed from the laminate sheet.

9. The method of claim 1, comprising finishing an edge of the information carrying card to have a predetermined geometry.

10. The method of claim 1, wherein a locating device is configured to inspect the laminate sheet, a separation device is configured to separate the plurality of information carrying cards from the laminate sheet, and wherein the method comprises transferring the laminate sheet from the locating device to the separation device.

\* \* \* \* \*